United States Patent [19]

Shingaki et al.

[11] Patent Number: 5,381,278
[45] Date of Patent: Jan. 10, 1995

[54] POLARIZATION CONVERSION UNIT, POLARIZATION ILLUMINATION APPARATUS PROVIDED WITH THE UNIT, AND PROJECTOR PROVIDED WITH THE APPARATUS

[75] Inventors: Junko Shingaki, Atsugi; Hideaki Mitsutake, Tokyo; Kazumi Kimura, Atsugi, all of Japan

[73] Assignee: Canon Kabushiki Kaisha, Japan

[21] Appl. No.: 146,801

[22] Filed: Nov. 1, 1993

Related U.S. Application Data

[63] Continuation of Ser. No. 878,723, May 5, 1992, abandoned.

[30] Foreign Application Priority Data

| May 7, 1991 | [JP] | Japan | 3-130265 |
| May 17, 1991 | [JP] | Japan | 3-140594 |
| May 17, 1991 | [JP] | Japan | 3-140683 |
| Jul. 17, 1991 | [JP] | Japan | 3-176735 |

[51] Int. Cl.$^6$ .................. G02B 5/30; G02B 27/28; G02F 1/1335; G03B 21/14
[52] U.S. Cl. ......................... 359/256; 353/20; 359/63; 359/495; 359/497; 359/499
[58] Field of Search ............ 359/256, 495, 496, 497, 359/499, 63, 65

[56] References Cited

U.S. PATENT DOCUMENTS

| 3,677,621 | 7/1972 | Smith | 359/495 |
| 4,560,999 | 12/1985 | Tokuhara | 346/160 |
| 4,864,390 | 9/1989 | McKechnie et al. | 358/60 |
| 4,989,076 | 1/1991 | Owada et al. | 358/61 |
| 5,122,895 | 6/1992 | Takanashi et al. | 359/256 |
| 5,124,841 | 6/1992 | Oishi | 359/496 |

FOREIGN PATENT DOCUMENTS

| 0152212 | 11/1981 | German Dem. Rep. | 359/495 |
| 53-132361 | 11/1978 | Japan | 359/495 |
| 56-137317 | 10/1981 | Japan | 359/495 |
| 61-90584 | 5/1986 | Japan . | |
| 2-250026 | 10/1990 | Japan | 359/495 |
| 2203854 | 10/1988 | United Kingdom | 359/495 |

*Primary Examiner*—Martin Lerner
*Attorney, Agent, or Firm*—Morgan & Finnegan

[57] ABSTRACT

A polarization conversion unit is disclosed. In the unit, a definitely polarized light emitted from a light source is divided into a pair of lights differing in polarized state and are caused to be incident on the optical components including the polarizing beam splitter. The plane of polarization of one of the paired polarized light is rotated to be coincident with the plane of polarization of the other light by the optical components, so that the paired lights with the same plane of polarization are caused to be separately emitted. The optical component has a plano-convex lens which has a positive power and which is arranged at an exit side where the paired lights are separately emitted. The lens has a focal point at a position further than the position of the surface to be illuminated.

23 Claims, 21 Drawing Sheets

POLARIZATION CONVERSION UNIT, POLARIZATION ILLUMINATION APPARATUS PROVIDED WITH THE UNIT, AND PROJECTOR PROVIDED WITH THE APPARATUS

This a continuation of co-pending application Ser. No. 07/878,723, filed on May 5, 1992 now abandoned.

BACKGROUND OF THE INVENTION

1. Field of the Invention

The present invention relates to a polarization conversion unit, and a projector having the unit.

2. Related Background Art

Conventionally, for the purpose of an increase in luminance of an image to be projected onto a screen, the following projector is proposed. In this projector, a liquid crystal light valve is illuminated with a polarization conversion unit for splitting indefinitely polarized light emitted from a light source into two linearly polarized light components having planes of polarization, which are perpendicular to each other, for equalizing the planes of polarization of the two split linearly polarized light components, and for separately outputting the two linearly polarized light components having the equalized planes of polarization.

FIG. 1 is a schematic view of a projector described in Japanese Laid-Open Patent Application No. 61-90584 as the prior art of a projector of this type.

This projector is constituted by a light source unit including a light source 301, a reflection mirror 302, an infrared cut filter 303, and a condenser lens 304, a polarization conversion unit including a polarization beam splitter 305, a total reflection prism 321, a λ/2 optical phase plate 322, and first and second wedge-shaped lenses 323 and 324, a liquid crystal light valve 310, a polarizing plate 325, and a projection-lens 326.

White light as indefinitely polarized light emitted from the light source 301 is input to the infrared cut filter 303 to absorb light components other than visible light such as infrared rays, and is then converted into collimated white light $L_S+L_P$ by the condenser lens 304. The collimated white light $L_S+L_P$ is incident on the polarization beam splitter 305, and is split into first P-polarized light $L_P$ and first S-polarized light $L_S$ since P-polarized light is transmitted through an active surface (a deposition film formed on an inclined surface where two rectangular prisms are adhered to each other) 311a of the polarization beam splitter 305, and S-polarized light is reflected upward at a right angle by the active surface 311a. The S-polarized light is linearly polarized light having a plane of polarization parallel to the active surface 311a, and the P-polarized light is linearly polarized light having a plane of polarization perpendicular to that of the S-polarized light. The first P-polarized light $L_P$ emerges from the exit surface of the polarization beam splitter 305. The first S-polarized light $L_S$ is incident on the total reflection prism 321, and is reflected to the right at a right angle by the inclined surface of the total reflection prism 321. Thereafter, the S-polarized light $L_S$ emerges from the exit surface of the total reflection prism 321 to be parallel to the first P-polarized light $L_P$. At this time, the first S-polarized light $L_S$ is transmitted through the λ/2 optical phase plate 322 opposing the exit surface of the total reflection prism 321, and its plane of polarization is rotated through 90°. Thus, the first S-polarized light $L_S$ is converted into second P-polarized light $L_P^*$. The first and second wedge-shaped lenses 323 and 324 for deflecting an optical path are respectively arranged at the exit surface sides of the polarization beam splitter 305 and the λ/2 optical phase plate 322. The optical paths of the first P-polarized light $L_P$ emerging from the polarization beam splitter 305 and the second P-polarized light $L_P^*$ emerging from the λ/2 optical phase plate 322 are deflected by the first and second wedge-shaped lenses 323 and 324, so that these two light components cross at a point $P_O$ on the incident surface of the liquid crystal light valve 310. Thus, the two light components are synthesized at the point $P_0$. The first and second P-polarized light components $L_P$ and $L_P^*$ are modulated according to an image signal by the liquid crystal light valve 310 to be converted into image light including the P- and S-polarized light components. The P-polarized light component of the image light is transmitted through the polarization plate 325, and thereafter, is projected onto a screen (not shown) by the projection lens 326, thus projecting an image on the screen in an enlarged scale.

Therefore, in this projector, the collimated white light $L_S+L_P$ (indefinitely polarized light) emitted from the light source unit is split into the first P-polarized light $L_P$ and the first S-polarized light $L_S$ by the polarization beam splitter 305 (two linearly polarized light components having planes of polarization, which are perpendicular to each other), and the first S-polarized light $L_S$ is converted into the second P-polarized light $P_P^*$ by the λ/2 optical phase plate 322. Thus, the liquid crystal light valve 310 can be illuminated with the first and second P-polarized light components $L_P$ and $L_P^*$ having the equalized planes of polarization.

However, the above-mentioned projector has the following drawbacks.

(1) When the positional relationship between the wedge-shaped lenses 323 and 324, and the liquid crystal light valve 310 is not set with high precision, an image projected onto the screen suffers from a difference in luminance. More specifically, when the distance from the wedge-shaped lenses 323 and 324 to the liquid crystal light valve 310 is shortened, as shown in FIG. 2, since the first and second P-polarized light components $L_P$ and $L_P^*$ respectively emerging from the first and second wedge-shaped lenses 323 and 324 only partially overlap each other on the incident surface of the liquid crystal light valve 310, a difference in luminance occurs between the central portion and the peripheral portion of an image projected onto the screen. Therefore, the distance between the wedge-shaped lenses 323 and 324, and the liquid crystal light valve 310 must be adjusted, so that the first and second P-polarized light components $L_P$ and $L_P^*$ respectively emerging from the first and second wedge-shaped lenses 323 and 324 can entirely overlap each other on the incident surface of the liquid crystal light valve 310, as shown in FIG. 3.

(2) The image quality of an image projected on the screen is undesirably deteriorated. More specifically, when the incident angle of incident light is increased, the modulation characteristics and transmission characteristics of the liquid crystal light valve 310 are normally deteriorated. For this reason, the image quality is inevitably deteriorated in the above-mentioned projector since the first and second P-polarized light components $L_P$ and $L_P^*$ are incident at an incident angle $\theta_1$ on the entire incident surface of the liquid crystal light valve 310.

(3) Since the projection lens 326 having a large effective diameter is required, the design condition of the projection lens 326 becomes stricter in consideration of aberration correction, and a lens focal length (i.e., a projection distance of the projector type display apparatus) is undesirably prolonged. More specifically, as shown in FIG. 3, image light emerging from an arbitrary point of the liquid crystal light valve 310 emerges to have a spread angle $2\theta_1$ with respect to the incident angle $\theta_1$. For this reason, in order to receive all the image light components including image light components emerging from the peripheral portion of the liquid crystal light valve 310, the effective diameter of the projection lens 326 must be considerably increased.

(4) If the polarization conversion factor of a polarizing element is not 100%, an image projected onto the screen suffers from a decrease in contrast. More specifically, if the polarization conversion factor of the polarization conversion unit is decreased from 100% due to the polarization split factor at the active surface of the polarization beam splitter 305 and the wavelength dependency of the retardation amount of the $\lambda/2$ optical phase plate 322, the first and second P-polarized light components $L_P$ and $L_P*$ independently emerging from the polarization conversion unit include a polarized light component having a slightly shifted plane of polarization. For this reason, when the liquid crystal light valve 310 is illuminated with these first and second P-polarized light components $L_P$ and $L_P*$, image light emerging from the liquid crystal light valve 310 also includes an unnecessary light component. As a result, the contrast of an image projected onto the screen is undesirably decreased.

Even when wedge-shaped lenses for decreasing the incident angle $\theta_1$ are used in place of the wedge-shaped lenses 323 and 324 to decrease the spread angle of image light and consequently to eliminate the above-mentioned drawbacks (1) to (3), the distance between the wedge-shaped lenses and the liquid crystal light valve 310 must be increased to be longer than the distance shown in FIG. 3, so that the first and second P-polarized light components $L_P$ and $L_P*$ emerging from the wedge-shaped lenses entirely overlap each other on the incident surface of the liquid crystal light valve 310, thus preventing a compact structure of the projector.

SUMMARY OF THE INVENTION

It is an object of the present invention to provide a projector, which can improve image quality of an image, can moderate the design condition of a projection lens, and can prevent a decrease in contrast of an image.

In a polarization conversion unit of the present invention, an optical element having a positive power is arranged at the side of the exit surface.

In a polarization conversion unit of the present invention, an optical element having a positive power is arranged at the exit surface of the polarization conversion unit, and a polarization plate, which transmits two linearly polarized light components independently emerging from the polarization conversion unit, is arranged between the polarization conversion unit and a liquid crystal light valve.

A polarization conversion unit of the present invention includes at least one of a first optical element, arranged along an optical path of second P-polarized light $L_P*$, for converging the second P-polarized light $L_P*$, and a second optical element, arranged along an optical path of first P-polarized light $L_P$, for diverging the first P-polarized light $L_P$.

DETAILED DESCRIPTION OF THE PREFERRED EMBODIMENTS

The preferred embodiments of the present invention will be described below with reference to the accompanying drawings.

Figure 4:
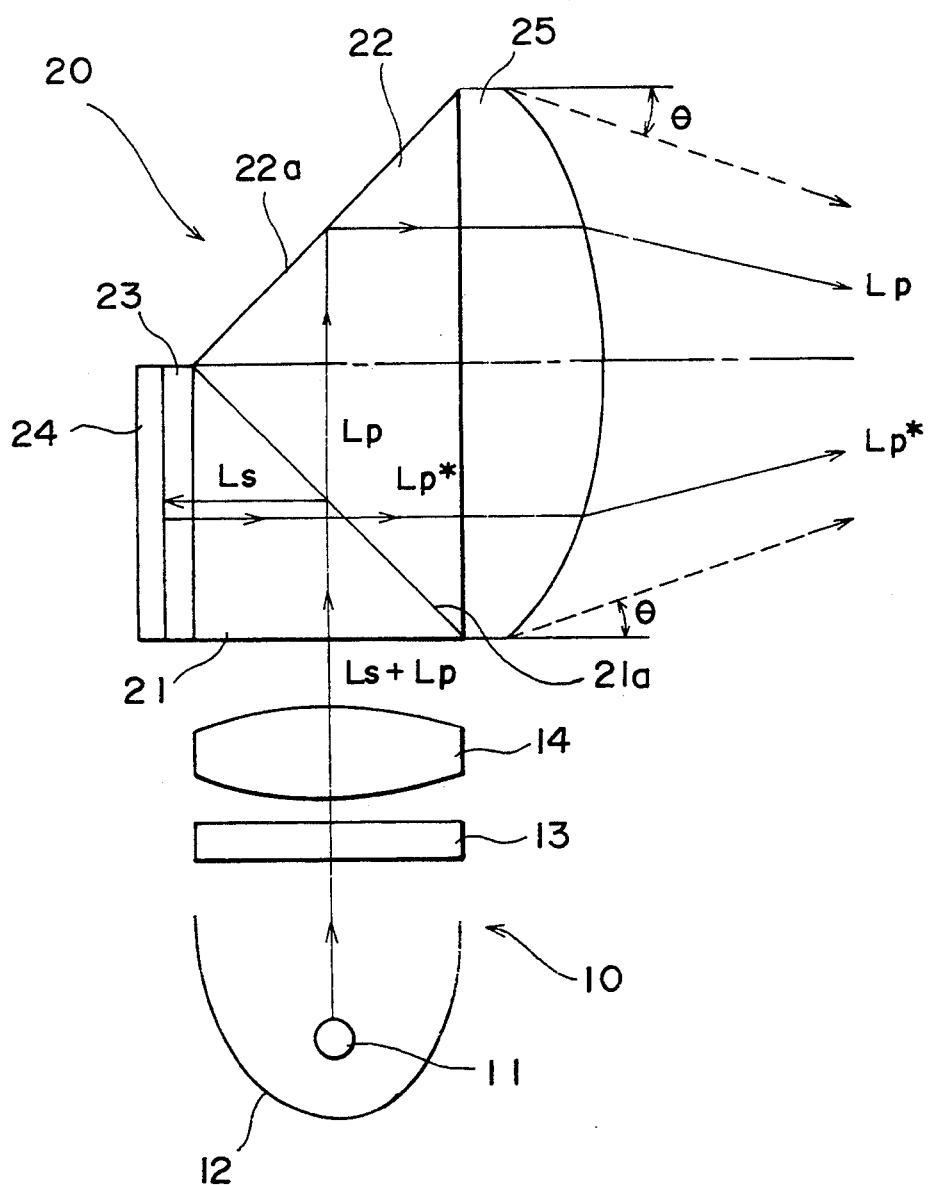
FIG. 4 is a schematic view showing an embodiment of a polarization conversion unit according to the present invention.

FIG. 4 is a schematic view showing an embodiment of a polarization conversion unit according to the present invention.

A polarization conversion unit 20 of this embodiment splits collimated white light $L_S+L_P$ (indefinitely polarized light) emitted from a light source unit 10 into first P-polarized light $L_P$ and first S-polarized Night $L_S$ (two linearly polarized light components) having planes of polarization, which are perpendicular to each other. The unit 20 converts the first S-polarized light $L_S$ into second P-polarized light $L_P^*$ by rotating its plane of polarization through 90°, thus equalizing the planes of polarization of the first P-polarized light $L_P$ and the first S-polarized light $L_S$. The unit 20 then outputs the first and second P-polarized light components $L_P$ and $L_P^*$ (two linearly polarized light components having the equalized planes of polarization) independently of each other. The light source unit 10 is constituted by a light source 11, comprising, e.g., a halogen lamp, a metal halide lamp, or the like, for emitting white light, a reflection mirror 12 for reflecting some light components of the white light emitted from the light source 11, a heat cut filter 13 for absorbing or reflecting heat rays of the white light incident directly from the light source 11 or through the reflection mirror 12, and a condenser lens 14 for converting the white light from which the heat rays are removed into collimated white light $L_S+L_P$. The polarization conversion unit 20 is constituted by a polarization beam splitter 21 having an active surface (a deposition film formed on an inclined surface where two rectangular prisms are adhered to each other) 21a, one end of which contacts one end of the incident surface at an angle of 45°, and an exit surface, one end of which contacts one end of the incident surface at an angle of 90°, a total reflection prism 22, having a total reflection surface 22a, one end of which contacts the other end of the active surface 21a of the polarization beam splitter 21 at an angle of 90°, for reflecting first P-polarized light $L_P$ to the right (FIG. 4) at a right angle to cause it to emerge from the exit surface, a λ/4 optical phase plate 23, one end of which contacts the other end of the active surface 21a of the polarization beam splitter 21 at an angle of 45°, the other end of which contacts the other end of the incident surface of the polarization beam splitter 21 at an angle of 90°, and which perpendicularly receives first S-polarized light $L_S$, a reflection plate 24, whose reflection surface formed of an aluminum deposition film or an optical multi-layered film is adhered on the surface of the λ/4 optical phase plate 23 opposite to the polarization beam splitter 21, for reflecting the first S-polarized light $L_S$ transmitted through the λ/4 optical phase plate 23 in a direction of the λ/4 optical phase plate 23, and a plano-convex lens 25 as an optical element having a positive power, the flat surface of which is arranged to be in tight contact with the exit surface of the polarization beam splitter 21 and the exit surface of the total reflection prism 22.

Collimated white light $L_S+L_P$ emerging from the condenser lens 14 is split into first P-polarized light $L_P$ and first S-polarized light $L_S$ since P-polarized light is transmitted through the active surface 21a of the polarization beam splitter 21, and S-polarized light is reflected to the left (FIG. 4) at a right angle. The first S-polarized light $L_S$ is perpendicularly incident on the λ/4 optical phase plate 23, is then transmitted through the λ/4 optical phase plate 23, is reflected by the reflection surface of the reflection plate 24, and thereafter, is transmitted through the λ/4 optical phase plate 23 again. As a result, the plane of polarization of the first S-polarized light $L_S$ is rotated through 90°, and the first S-polarized light $L_S$ is converted into second P-polarized light $L_P^*$. The second P-polarized light $L_P^*$ is directly transmitted through the active surface 21a of the polarization beam splitter 21, and emerges from the exit surface of the polarization beam splitter 21. At this time, the second P-polarized light component $L_P^*$ emerging from the upper end of the exit surface of the polarization beam splitter 21 emerges from the plano-convex lens 25 to be almost parallel to the optical axis indicated by an alternate long and short dashed line, and the second P-polarized light component $L_P^*$ emerging from the lower end of the exit surface of the polarization beam splitter 21 emerges from the plano-convex lens 25 to be converged by an angle $\theta$, as indicated by a broken line. On the other hand, the first P-polarized light $L_P$ is reflected to the right (FIG. 4) at a right angle by the total reflection surface 22a of the total reflection prism 22, and thereafter, emerges from the exit surface of the total reflection prism 22. At this time, the first P-polarized light component $L_P$ emerging from the lower end of the total reflection prism 22 emerges from the plano-convex lens 25 to be almost parallel to the optical axis indicated by the alternate long and short dashed line, and the first P-polarized light component $L_P$ emerging from the upper end of the exit surface of the total reflection prism 22 emerges from the plano-convex lens 25 to be converged by an angle $\theta$, as indicated by a broken line.

Therefore, the polarization conversion unit 20 of this embodiment can output the first and second P-polarized light components $L_P$ and $L_P^*$, so that the first and second P-polarized light components $L_P$ and $L_P^*$ are focused at one point without overlapping each other. As shown in FIG. 4, since the first and second P-polarized light components $L_P$ and $L_P^*$ can be output to have the same optical path length, illuminance obtained when the light source 11 for emitting non-collimated light is used can be prevented from being unbalanced.

Figure 5:
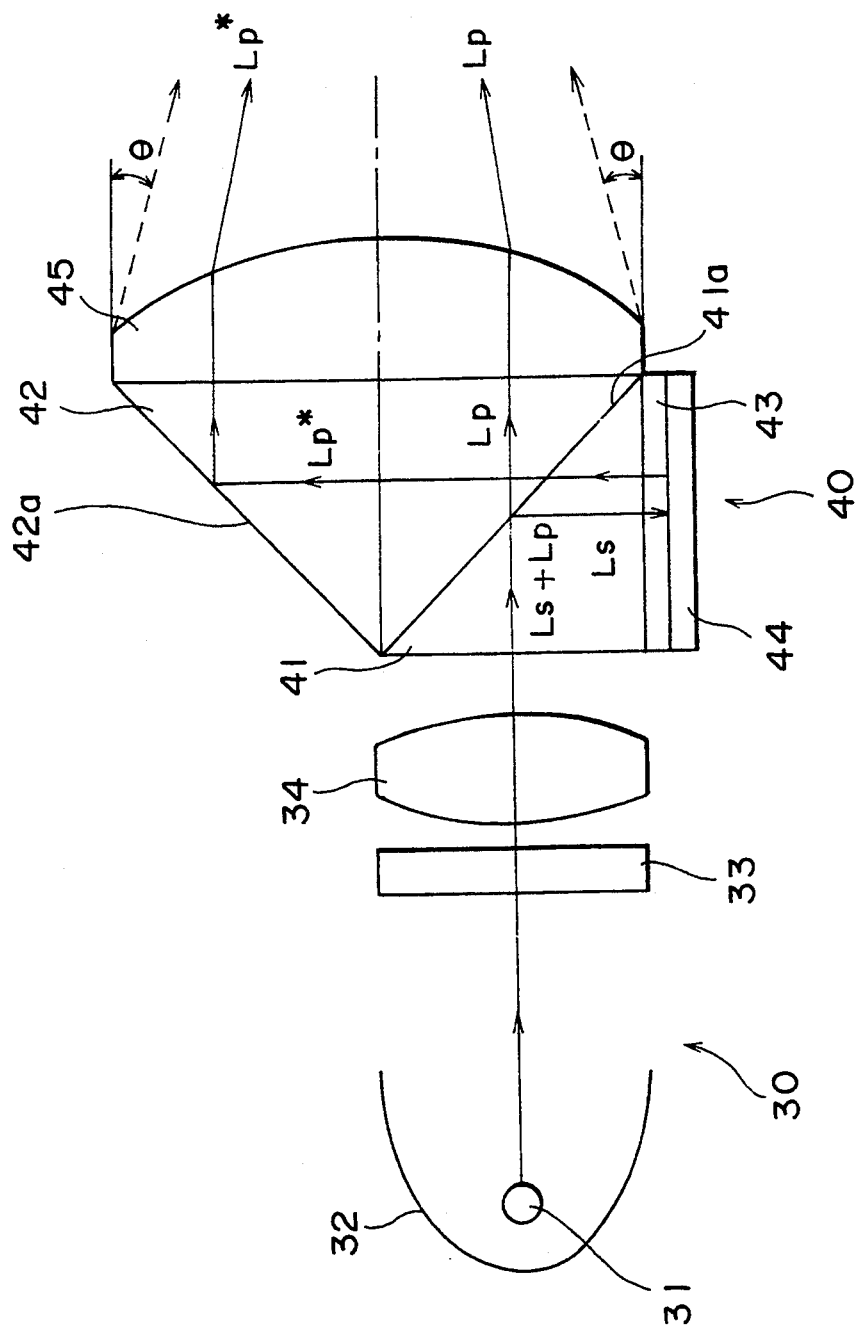
FIG. 5 is a schematic view showing another embodiment of a polarization conversion unit according to the present invention.

FIG. 5 is a schematic view showing another embodiment of a polarization conversion unit according to the present invention.

A difference between a polarization conversion unit 40 of this embodiment and the polarization conversion unit 20 shown in FIG. 4 is that first P-polarized light $L_P$ split by an active surface 41a of the polarization beam splitter 41 directly emerges from the exit surface of the polarization beam splitter 41, and first S-polarized light $L_S$ split by the active surface 41a of the polarization beam splitter 41 is converted into second P-polarized light $L_P^*$ by a λ/4 optical phase plate 43 and a reflection plate 44, is then reflected to the right (FIG. 5) at a right angle by a total reflection surface 42a of a total reflection prism 42, and emerges from the exit surface of the total reflection prism 42. Therefore, in the polarization conversion unit 20 shown in FIG. 4, the propagation direction of emerging light is shifted by 90° from the propagation direction of incident light. However, in the polarization conversion unit 40 of this embodiment, the propagation direction of emerging light can coincide with the propagation direction of incident light without adding an extra optical member.

Figure 6:
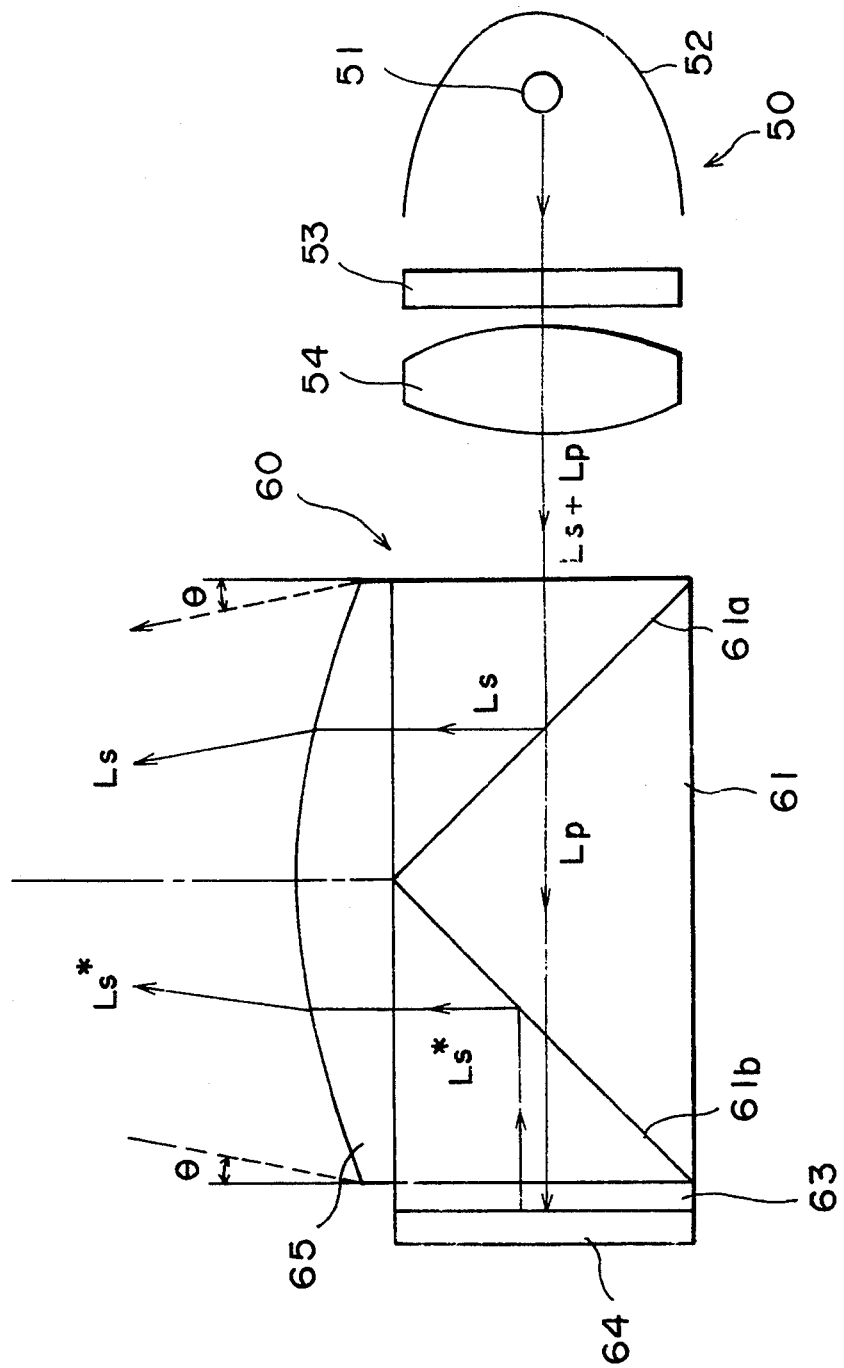
FIG. 6 is a schematic view showing still another embodiment of a polarization conversion unit according to the present invention.

FIG. 6 is a schematic view showing still another embodiment of a polarization conversion unit according to the present invention.

A difference between a polarization conversion unit 60 of this embodiment and the polarization conversion units 20 and 40 shown in FIGS. 4 and 5 is that first S-polarized light $L_S$ and second S-polarized light $L_S^*$ are output. More specifically, the polarization conversion unit 60 of this embodiment is constituted by a polarization beam splitter 61 having a first active surface (a deposition film formed on one of two inclined surfaces where three rectangular prisms are adhered) 61a, which transmits P-polarized light of collimated white light $L_S+L_P$ emitted from a light source unit 50, and reflects S-polarized light upward (FIG. 6) at a right angle, and a similar second active surface (a deposition film formed on the other one of the two inclined surfaces) 61b, one end of which contacts the first active surface 61a at a right angle, a λ/4 optical phase plate 63, one end of which contacts the other end of the second active surface 61b at an angle of 45°, and is adhered to the counter incident surface side of the polarization beam splitter 61, a reflection plate 64 having a reflection surface adhered to the λ/4 optical phase plate 63 at the side opposite to the polarization beam splitter 61, and a plano-convex lens 65 arranged to be in tight contact with the exit surface of the polarization beam splitter 61.

Collimated white light $L_S+L_P$ emerging from a condenser lens 54 is split into first P-polarized light $L_P$ and first-S-polarized light $L_S$ since P-polarized light is transmitted through the first active surface 61a of the polarization beam splitter 61, and S-polarized light is reflected upward (FIG. 6) at a right angle by the first active surface 61a. The first P-polarized light $L_P$ is transmitted through the second active surface 61b of the beam splitter 61, and is perpendicularly incident on the λ/4 optical phase plate 63, is then transmitted through the λ/4 optical phase plate 63, is reflected by the reflection surface of the reflection plate 64, and thereafter, is transmitted through the λ/4 optical phase plate 63 again. As a result, the plane of polarization of the P-polarized light $L_P$ is rotated through 90°, and the P-polarized light $L_P$ is converted into second S-polarized light $L_S^*$. The second S-polarized light $L_S^*$ is reflected upward (FIG. 6) at a right angle by the second active surface 61b of the polarization beam splitter 61, and emerges from the exit surface of the polarization beam splitter 61. At this time, the second S-polarized light component $L_S^*$ emerging from the central portion of the exit surface of the polarization beam splitter 61 emerges from the plano-convex lens 65 to be almost parallel to the optical axis indicated by an alternate long and short dashed line, and the second S-polarized light component $L_S^*$ emerging from the left end (FIG. 6) of the exit surface of the polarization beam splitter 61 emerges from the plano-convex lens 65 to be converged by an angle θ, as indicated by a broken line. On the other hand, the first S-polarized light $L_S$ emerges from the exit surface of the polarization beam splitter 61. In this case, the first S-polarized light component $L_S$ emerging from the central portion of the exit surface of the polarization beam splitter 61 emerges from the plano-convex lens 65 to be almost parallel to the optical axis, as indicated by the alternate long and short dashed line, and the first S-polarized light component $L_S$ emerging from the right end (FIG. 6) of the polarization beam splitter 61 emerges from the plano-convex lens 65 to be converged by an angle θ, as indicated by a broken line. Therefore, the polarization conversion unit 60 of this embodiment can output the first S-polarized light $L_S$ and the second S-polarized light $L_S^*$ so that the first S-polarized light $L_S$ and the second S-polarized light $L_S^*$ are focused at one point without overlapping each other.

In the above description, the plano-convex lens 25 shown in FIG. 4 is arranged to be in tight contact with the exit surfaces of the polarization beam splitter 21 and the total reflection prism 22. However, the lens 25 may be integrated with the polarization beam splitter 21 and the total reflection prism 22, or may be arranged to be separated from the polarization beam splitter 21 and the total reflection prism 22. When the lens 25 is integrated with the polarization beam splitter 21 and the total reflection prism 22, a surface reflection loss between optical members (i.e., between the polarization beam splitter 21 and the total reflection prism 22, and the plano-convex lens 25) can be reduced. When the lens 25 is arranged to be separated from the polarization beam splitter 21 and the total reflection prism 22, although a surface reflection loss occurs if no countermeasure is taken, an anti-reflection coating can be formed on the exit surfaces of the polarization beam splitter 21 and the total reflection prism 22, or on the incident surface of the plano-convex lens 25, thus preventing the surface reflection loss between the optical members. The same applies to the plano-convex lenses 45 and 65 shown in FIGS. 5 and 6. The structure of the polarization conversion unit is not limited to a structure for rotating the plane of polarization of first S-polarized light $L_S$ or first P-polarized light $L_P$ using the λ/4 optical phase plate 23, 43, or 63 and the reflection plate 24, 44, or 64 like in the polarization conversion unit 20, 40, or 60 shown in FIG. 4, 5, or 6. For example, in place of the first and second wedge-shaped lenses 323 and 324 of the polarization conversion unit shown in FIG. 1, plano-convex lenses may be used. Furthermore, in place of the plano-convex lens 25, 45, or 65 shown in FIG. 4, 5, or 6, a lens group having a positive power as a whole or a mirror having a positive power may be used.

An embodiment of a projector constituted by combining the polarization conversion unit according to the present invention with other optical members will be described below.

Figure 7:
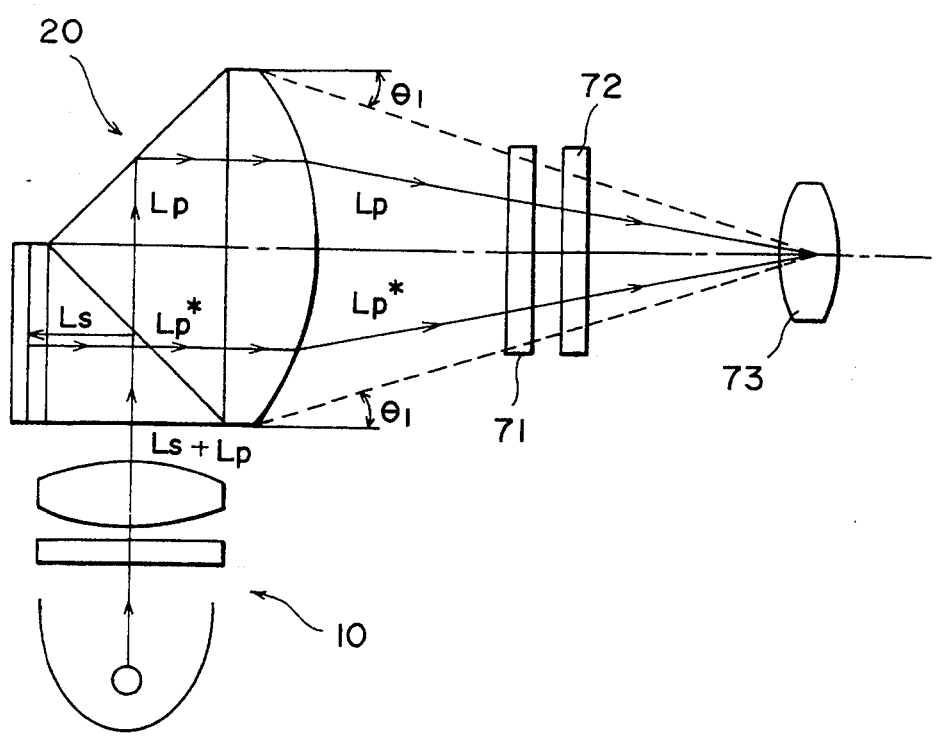
FIG. 7 is a view showing principal part of an embodiment of a projector having the polarization conversion unit shown in FIG. 4.

FIG. 7 is a view showing principal part of an embodiment of a projector having the polarization conversion unit 20 shown in FIG. 4.

The projector of this embodiment is constituted by the light source unit 10 (FIG. 4) for emitting collimated white light $L_S+L_P$ (indefinitely polarized light), the polarization conversion unit 20 (FIG. 4) which splits the collimated white light $L_S+L_P$ emitted from the light source unit 10 into first P-polarized light $L_P$ and first S-polarized light $L_S$ (two linearly polarized light components) having planes of polarization which are perpendicular to each other, converts the first S-polarized light $L_S$ into second P-polarized light $L_P{}^*$ by rotating the plane of polarization of the first S-polarized light $L_S$ through 90° so as to equalize the planes of polarization of the first P-polarized light $L_P$ and the first S-polarized light $L_S$, and separately outputs the first and second P-polarized light components $L_P$ and $L_P{}^*$ (two linearly polarized light components having the equalized planes of polarization), a liquid crystal light valve 71 for receiving the first and second P-polarized light components $L_P$ and $L_P{}^*$ separately emerging from the polarization conversion unit 20, a polarization plate 72 arranged to oppose the exit surface of the liquid crystal light valve 71, and a projection lens 73 arranged at the side, opposite to the liquid crystal light valve 71, of the polarization plate 72. Note that the focal point position of the plano-convex lens 25 (FIG. 4) of the polarization conversion unit 20 almost coincides with the pupil of the projection lens 73.

Since the polarization conversion unit 20 illuminates the liquid crystal light valve 71, the projector of this embodiment has the following advantages.

(1) The positional relationship between the polarization conversion unit 20 and the projection lens 73 is set so that the first and second P-polarized light components $L_P$ and $L_P{}^*$ separately emerging from the polarization conversion unit 20 are focused by the plano-convex lens 25 (FIG. 4) to form an image of the light source 11 (FIG. 4) on the pupil surface of the projection lens 73. Thus, since the entrance pupil of the projection lens 73 can always be smaller than the major diameter of the liquid crystal light valve 71, the effective diameter of the projection lens 73 can be decreased very much, and a bright image free from an aberration can be formed on a screen.

(2) Since the first and second P-polarized light components $L_P$ and $L_P{}^*$ separately emerging from the polarization conversion unit 20 are incident on the liquid crystal light valve 71 without overlapping each other, a difference in luminance of an image projected onto the screen can be prevented.

Figure 1:
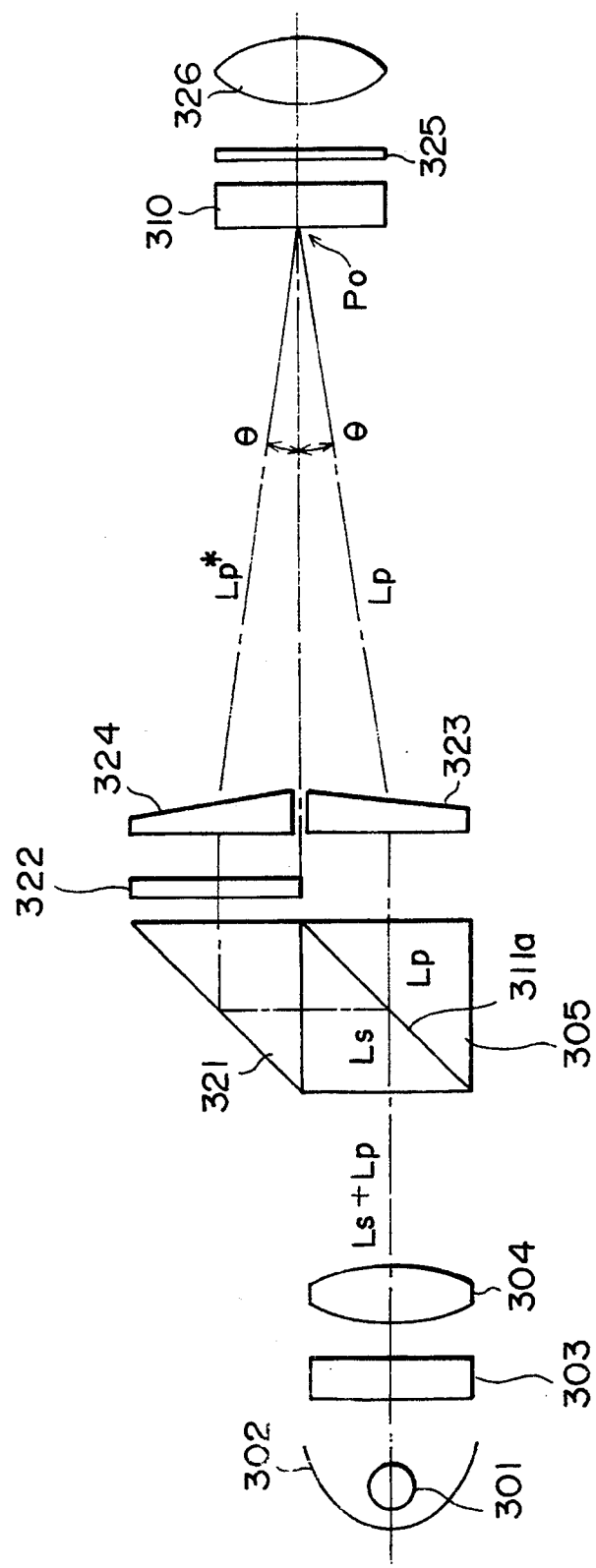
FIG. 1 is a view showing principal part of a conventional projector.
Figure 2:
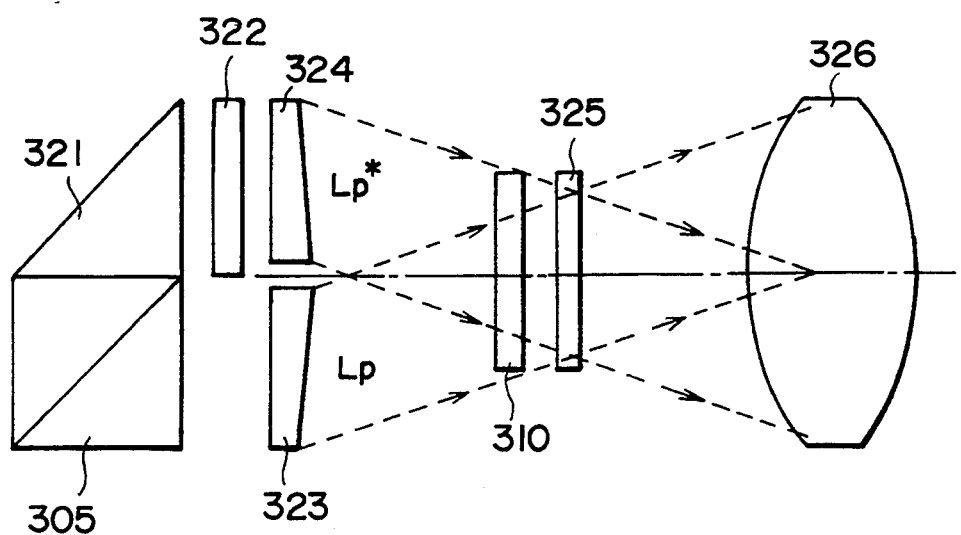
FIG. 2 is a view showing a drawback posed when the distance between first and second wedge-shaped lenses 323 and 324, and a liquid crystal light valve 310 is short in the projector shown in FIG. 1.
Figure 3:
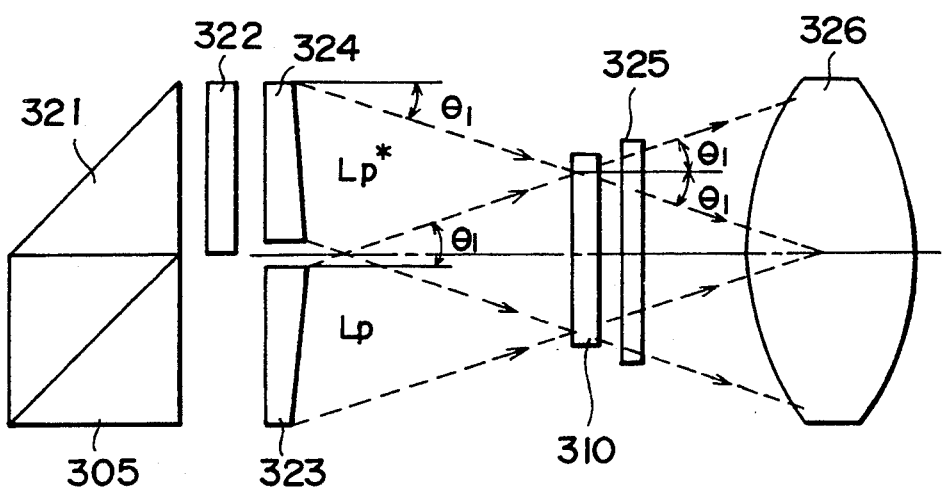
FIG. 3 is a view showing a spread angle of image light emerging from the liquid crystal light valve 310 in the projector shown in FIG. 1.

(3) When the distance between the polarization conversion unit 20 and the liquid crystal light valve 71 remains the same, an incident angle $\theta_1$ of each of the first and second P-polarized light components $L_P$ and $L_P{}^*$ emerging from the upper and lower ends of the polarization conversion unit 20 indicated by broken lines in FIG. 7 is the same as that of the conventional projector shown in FIG. 1. However, since the incident angle of each of the first and second P-polarized light components $L_P$ and $L_P{}^*$ emerging from the central portion of the polarization conversion unit 20 can always be smaller than the incident angle $\theta_1$, modulation characteristics and transmission characteristics at the central portion of the liquid crystal light valve 71 can be improved. In other words, when an image having image quality equivalent to that of the conventional projector shown in FIG. 1 is to be projected onto the screen, the distance between the polarization conversion unit 20 and the liquid crystal valve 71 can be shortened, thus allowing the compact structure of the overall projector. When the power of the plano-convex lens 25 (FIG. 4) of the polarization conversion unit 20 is increased, the overall projector can be further rendered compact.

Note that the same effects can be obtained when the polarization conversion unit 40 or 60 shown in FIG. 5 or 6 is used in place of the polarization conversion unit 20.

The present invention is applicable to the polarization conversion unit shown in FIG. 1.

Figure 8:
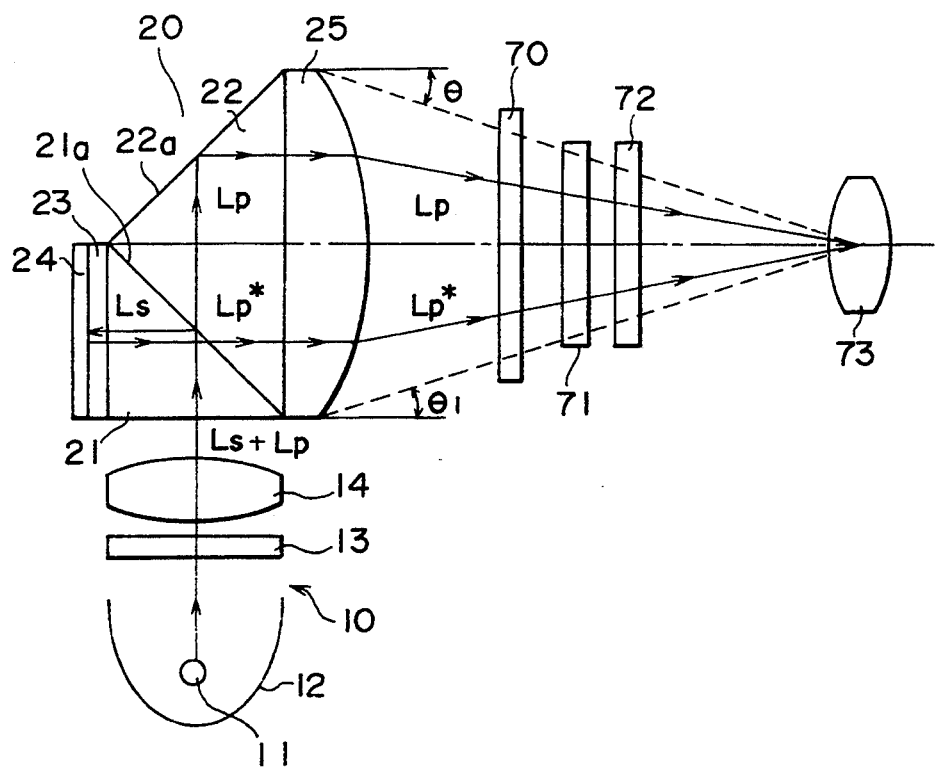
FIG. 8 is a view showing principal part of another embodiment of a projector according to the present invention.

FIG. 8 is a view showing principal part of another embodiment of a projector according to the present invention.

The projector of this embodiment is constituted by a light source unit 10 for emitting collimated white light $L_S+L_P$ (indefinitely polarized light), a polarization conversion unit 20 which splits the collimated white light $L_S+L_P$ emitted from the light source unit 10 into first P-polarized light $L_P$ and first S-polarized light $L_S$ (two linearly polarized light components) having planes of polarization which are perpendicular to each other, converts the first S-polarized light $L_S$ into second P-polarized light $L_P{}^*$ by rotating the plane of polarization of the first S-polarized light $L_S$ through 90° so as to equalize the planes of polarization of the first P-polarized light $L_P$ and the first S-polarized light $L_S$, and separately outputs the first and second P-polarized light components $L_P$ and $L_P{}^*$ (two linearly polarized light components having the equalized planes of polarization), a first polarization plate 70, arranged between the polarization conversion unit 20 and a liquid crystal light valve 71, for transmitting the first and second P-polarized light components $L_P$ and $L_P{}^*$ separately emerging from the polarization conversion unit 20, the liquid crystal light valve 71 for receiving the first and second P-polarized light components $L_P$ and $L_P{}^*$ separately emerging from the polarization conversion unit 20, a second polarization plate 72 arranged to oppose the exit surface of the liquid crystal light valve 71, and a projection lens 73 arranged at the side, opposite to the liquid crystal light valve 71, of the second polarization plate 72. A difference from the embodiment shown in FIG. 7 is that the first polarization plate is added.

The operation of the projector shown in FIG. 8 will be described below.

Collimated white light $L_S+L_P$ emitted from the light source unit 10 is split into first P-polarized light $L_P$ and first S-polarized light $L_S$ since P-polarized light is transmitted through an active surface 21a of a polarization beam splitter 21, and S-polarized light is reflected to the left (FIG. 8) at a right angle by the active surface 21a. The first S-polarized light $L_S$ is perpendicularly incident on a λ/4 optical phase plate 23, is then transmitted through the λ/4 optical phase plate 23, is reflected by the reflection surface of a reflection plate 24, and thereafter, is transmitted through the λ/4 optical phase plate 23 again. As a result, the plane of polarization of the S-polarized light $L_S$ is rotated through 90°, and the S-polarized light $L_S$ is converted into second P-polarized light $L_P{}^*$. The second P-polarized light $L_P{}^*$ is directly transmitted through the active surface 21a of the polarization beam splitter 21, and emerges from the exit surface of the polarization beam splitter 21. At this time, the second P-polarized light component $L_P{}^*$ emerging from the upper end of the exit surface of the polarization beam splitter 21 emerges from a plano-convex lens 25 to be almost parallel to the optical axis indicated by an alternate long and short dashed line, and the second P-polarized light component $L_P{}^*$ emerging from the lower end of the exit surface of the polarization beam splitter 21 emerges from the plano-convex lens 25 to be converged by an angle $\theta_1$, as indicated by a broken line. On the other hand, the first P-polarized light $L_P$ is reflected to the right (FIG. 8) at a right angle by a total reflection surface 22a of a total reflection prism 22, and thereafter, emerges from the exit surface of the total reflection prism 22. At this time, the first P-polarized light component $L_P$ emerging from the lower end of the total reflection prism 22 emerges from the plano-convex lens 25 to be almost parallel to the optical axis indicated by the alternate long and short dashed line, and the first P-polarized light component $L_P$ emerging from the upper end of the exit surface of the total reflection prism 22 emerges from the plano-convex lens 25 to be converged by the angle $\theta_1$, as indicated by a broken line. When the polarization conversion factor of the polarization conversion unit 20 is decreased from 100% due to the polarization separation ratio at the active surface 21a of the polarization beam splitter 21, the wavelength dependency of the retardation amount of the $\lambda/4$ optical phase plate 23, and the like, the first and second P-polarized light components $L_P$ and $L_P^*$ separately emerging from the polarization conversion unit 20 include a polarized light component having a slightly shifted plane of polarization. However, when the first and second P-polarized light components $L_P$ and $L_P^*$ are transmitted through the first polarization plate 70, the polarized light component having the slightly shifted plane of polarization is shielded by the first polarization plate 70, thus aligning the planes of polarization of the first and second P-polarized light components $L_P$ and $L_P^*$. The first and second P-polarized light components $L_P$ and $L_P^*$ having the aligned planes of polarization are modulated by the liquid crystal light valve 71 according to an image signal so as to be converted into image light including P- and S-polarized light components. At this time, since the planes of polarization of the first and second P-polarized light components $L_P$ and $L_P^*$ are aligned, the image light does not include an unnecessary light component. The P-polarized light component of the image light is transmitted through the second polarization plate 72, and is projected by the projection lens 73 onto a screen (not shown), thus projecting an image onto the screen in an enlarged scale.

Therefore, the projector of this embodiment also has the following effect in addition to the above-mentioned three effects.

(4) Since the first and second P-polarized light components $L_P$ and $L_P^*$ are incident on the liquid crystal light valve 71 after their planes of polarization are aligned by the first polarization plate 70, image light emerging from the liquid crystal light valve 71 does not include an unnecessary light component. For this reason, even if the conversion efficiency of the polarization conversion unit 20 is not 100%, a decrease in contrast of an image projected onto the screen can be prevented. In embodiments to be described below, the same effects can be obtained if the polarization plate 70 is used.

A polarization conversion unit that can be used in the projector of the present invention is not limited to the polarization conversion unit 20 shown in FIG. 4, but may be the polarization conversion unit 40 or 60 shown in FIG. 5 or 6.

Figure 9:
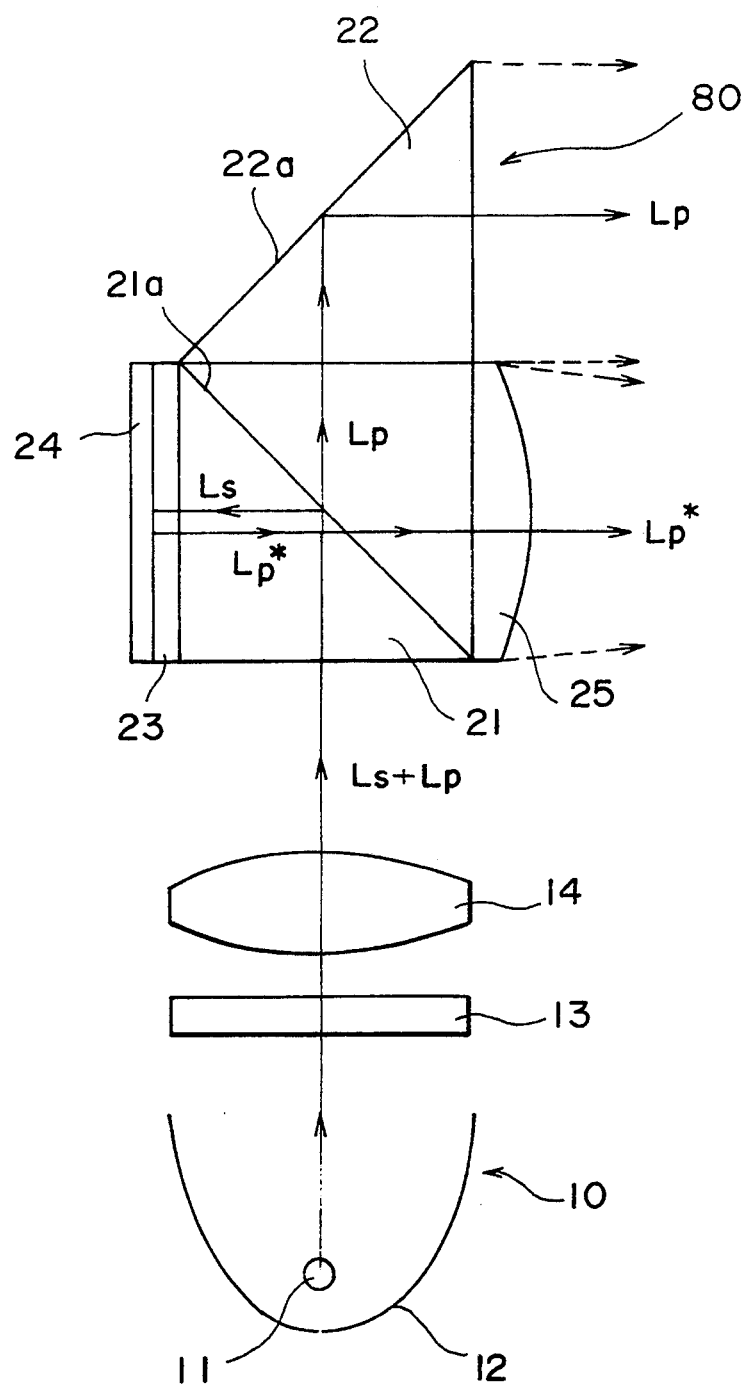
FIG. 9 is a schematic view showing still another embodiment of a polarization conversion unit according to the present invention.

FIG. 9 is a schematic view showing still another embodiment of a polarization conversion unit according to the present invention.

In a polarization conversion unit 80 of this embodiment, collimated white light $L_S+L_P$ (indefinitely polarized light) emitted from a light source unit 10 is split into P-polarized light $L_P$ (second linearly polarized light) and S-polarized light $L_S$ (first linearly polarized light), which have planes of polarizations that are perpendicular to each other. The S-polarized light $L_S$ is converted into P-polarized light (converted P-polarized light $L_P^*$) by rotating the plane of polarization of the S-polarized light $L_S$ through 90°, thereby equalizing the planes of polarization of the P-polarized light $L_P$ and the S-polarized light $L_S$. Thereafter, the P-polarized light $L_P$ and the converted P-polarized light $L_P^*$ are separately output. The light source unit 10 is constituted by a light source 11, comprising, e.g., a halogen lamp, a metal halide lamp, or the like, for emitting white light, a reflection mirror 12 for reflecting some light components of the white light emitted from the light source 11, a heat cut filter 13 for absorbing or reflecting heat rays of the white light incident directly from the light source 11 or through the reflection mirror 12, and a condenser lens 14 for converting the white light from which the heat rays are removed into collimated white light $L_S+L_P$. The polarization conversion unit 80 is constituted by a polarization beam splitter 21 having an active surface (a deposition film formed on an inclined surface where two rectangular prisms are adhered to each other) 21a, one end of which contacts one end of an incident surface at an angle of 45°, and an exit surface, one end of which contacts one end of the incident surface at an angle of 90°, a total reflection prism 22, having a total reflection surface 22a, one end of which contacts the other end of the active surface 21a of the polarization beam splitter 21 at an angle of 90°, for reflecting P-polarized light $L_P$ to the right (FIG. 9) at a right angle to cause it to emerge from the exit surface, a $\lambda/4$ optical phase plate 23, one end of which contacts the other end of the active surface 21a of the polarization beam splitter 21 at an angle of 45°, the other end of which contacts the other end of the incident surface of the polarization beam splitter 21 at an angle of 90°, and which perpendicularly receives S-polarized light $L_S$, a reflection plate 24, whose reflection surface formed of an aluminum deposition film or an optical multi-layered film is adhered on the surface of the $\lambda/4$ optical phase plate 23 opposite to the polarization beam splitter 21, for reflecting the S-polarized light $L_S$ transmitted through the $\lambda/4$ optical phase plate 23 in a direction of the $\lambda/4$ optical phase plate 23, and a plano-convex lens 25 as a first optical element, the flat surface of which is arranged to be in tight contact with the exit surface of the polarization beam splitter 21.

Collimated white light $L_S+L_P$ emerging from the condenser lens 14 is split into P-polarized light $L_P$ and S-polarized light $L_S$ since P-polarized light is transmitted through the active surface 21a of the polarization beam splitter 21, and S-polarized light is reflected to the left (FIG. 4) at a right angle. The S-polarized light $L_S$ is perpendicularly incident on the $\lambda/4$ optical phase plate 23, is then transmitted through the $\lambda/4$ optical phase plate 23, is reflected by the reflection surface of the reflection plate 24, and thereafter, is transmitted through the $\lambda/4$ optical phase plate 23 again. As a result, the plane of polarization of the S-polarized light $L_S$ is rotated through 90°, and the S-polarized light $L_S$ is converted into P-polarized light. The converted P-polarized light $L_P^*$ is directly transmitted through the active surface 21a of the polarization beam splitter 21, and emerges from the exit surface of the polarization beam splitter 21. At this time, the converted P-polarized light components $L_P*$ emerging from the upper and lower end portions of the exit surface of the polarization beam splitter 21 emerge from the plano-convex lens 25 to be converged as indicated by broken lines. On the other hand, the P-polarized light $L_P$ is reflected to the right (FIG. 9) at a right angle by the total reflection surface 22a of the total reflection prism 22, and thereafter, emerges from the exit surface of the total reflection prism 22.

Therefore, in the polarization conversion unit 80 of this embodiment, even when the light amount per unit area of the converted P-polarized light $L_P*$ becomes smaller than the light amount per unit area of the P-polarized light $L_P$ due to the influences of reflection efficiency of the active surface 21a of the polarization beam splitter 21 with respect to the S-polarized light $L_S$, the wavelength dependency of the retardation amount of the λ/4 optical phase plate 23, the reflection loss of the reflection plate 24, and the like, since the converted P-polarized light $L_P*$ emerges after it is converged by the plano-convex lens 25, the insufficient light amount of the converted P-polarized light $L_P*$ can be compensated for. In the embodiment shown in FIG. 9, since the converted P-polarized light component $L_P*$ emerging from the upper end (a junction portion with the total reflection prism 22) of the exit surface of the polarization beam splitter 21 is converged by the plano-convex lens 25, a gap from the P-polarized light $L_P$ emerging from the lower end (a junction portion with the polarization beam splitter 21) of the exit surface of the total reflection prism 22 is formed. However, when the light source 11 has a finite diameter, since the converted P-polarized light $L_P*$ and the P-polarized light $L_P$ have finite spot sizes, no problem is posed.

As described above, in this embodiment, a surface to be illuminated can be illuminated with uniform illumination light free from luminance nonuniformity.

Figure 10:
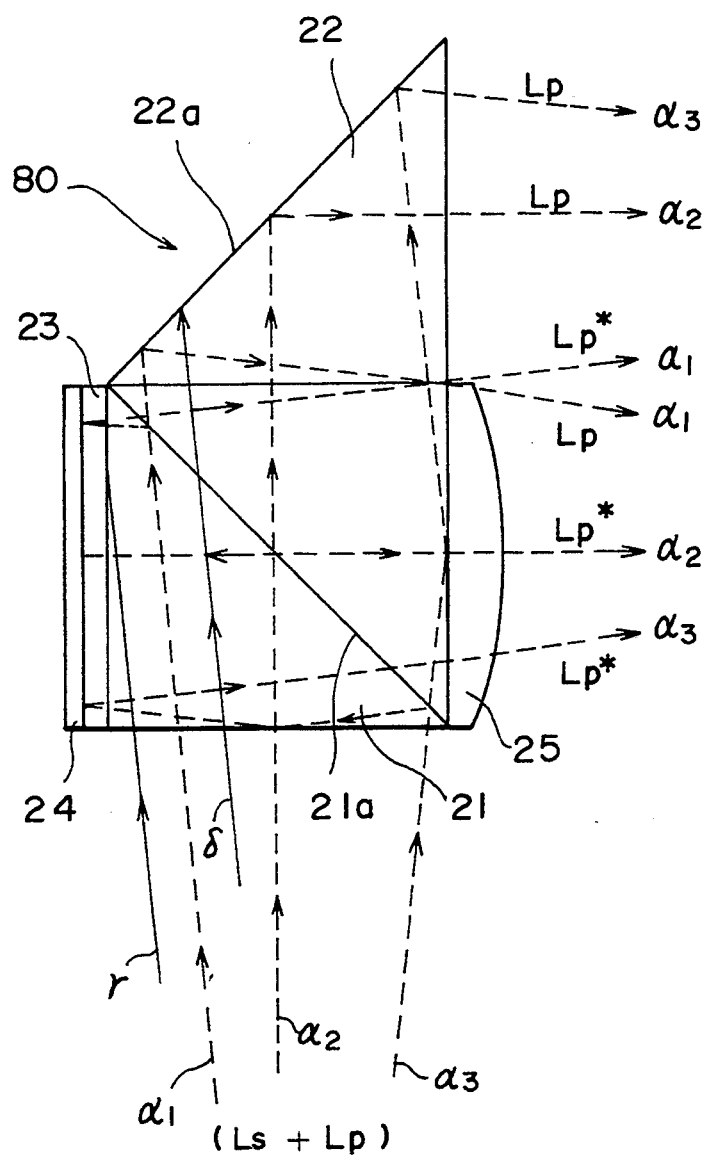
FIG. 10 is an explanatory view of an optical path in the polarization conversion unit 20 shown in FIG. 9.

In the polarization conversion unit 80 of this embodiment, when the light source 11 has a finite diameter, collimated white light $L_S+L_P$ emerging from the condenser lens 14 cannot be perfectly collimated light. However, as indicated by rays $\alpha_1$, $\alpha_2$, and $\alpha_3$ in FIG. 10, since collimated white light $L_S+L_P$ incident on the incident surface of the polarization beam splitter 21 is always incident on the active surface 21a of the polarization beam splitter 21, the collimated white light $L_S+L_P$ can be split into P-polarized light $L_P$ and S-polarized light $L_S$. In addition, since the S-polarized light $L_S$ is always incident on the λ/4 optical phase plate 23, it can be converted into P-polarized light by rotating its plane of polarization through 90°. On the contrary, the P-polarized light $L_P$ never becomes incident on the λ/4 optical phase plate 23. When collimated white light $L_S+L_P$ is obliquely incident on the λ/4 optical phase plate 23 like a ray γ, it may be transmitted through or absorbed by the λ/4 optical phase plate 23 to cause a light amount loss. In this case, when an optical multi-layered film for reflecting light having an incident angle like the ray γ, and transmitting normal light having a small incident angle is formed on the junction surface between the polarization beam splitter 21 and the λ/4 optical phase plate 23, the light amount loss can be prevented. When collimated white light $L_S+L_P$ is incident on the total reflection surface 22a of the total reflection prism 22 at an angle equal to or smaller than the total reflection angle like a ray δ, some P-polarized light components $L_P$ are transmitted through the total reflection surface 22a to cause a light amount loss. However, when a reflection optical multi-layered film, a metal reflection film, or the like is formed on the total reflection surface 22a, the light amount loss can be prevented.

Figure 11:
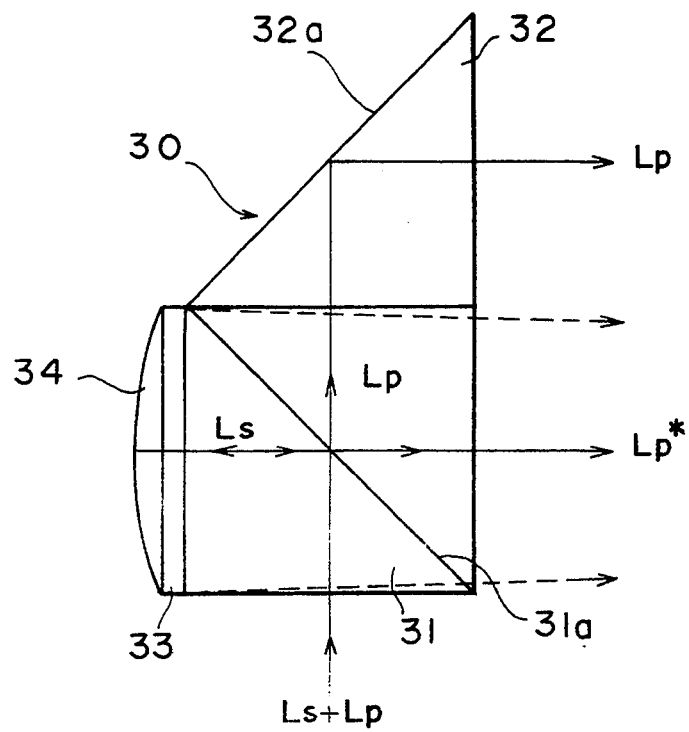
FIG. 11 is a schematic view showing still another embodiment of a polarization conversion unit according to the present invention.

FIG. 11 is a schematic view showing still another embodiment of a polarization conversion unit according to the present invention.

A difference between a polarization conversion unit 30 of this embodiment and the polarization conversion unit 80 shown in FIG. 9 is that the plano-convex lens 25 is not arranged on the exit surface of a polarization beam splitter 31, and in place of the reflection plate 24, a concave reflection mirror 34 as a first optical element is arranged on a λ/4 optical phase plate 33 at the side opposite to the polarization beam splitter 31.

P-polarized light $L_P$ split by an active surface 31a of the polarization beam splitter 31 is reflected to the right (FIG. 11) at a right angle by a total reflection surface 32a of a total reflection prism 32, and emerges from the exit surface of the total reflection prism 32. S-polarized light $L_S$ split by the active surface 31a of the polarization beam splitter 31 is converted into P-polarized light (converted P-polarized light $L_P*$) by the λ/4 optical phase plate 33 and the concave reflection mirror 34, and the converted P-polarized light $L_P*$ emerges from the exit surface of the polarization beam splitter 31. At this time, the converted P-polarized light components $L_P*$ emerging from the upper and lower end portions of the exit surface of the polarization beam splitter 31 emerge after they are converged by the concave reflection mirror 34, as indicated by broken lines.

Figure 12:
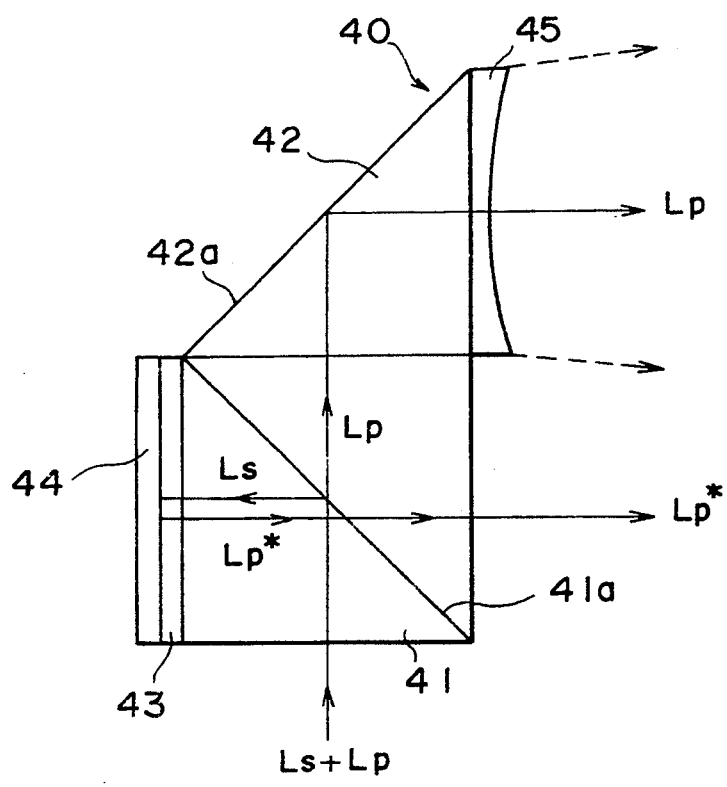
FIG. 12 is a schematic view showing still another embodiment of a polarization conversion unit according to the present invention.

FIG. 12 is a schematic view showing still another embodiment of a polarization conversion unit according to the present invention.

A difference between a polarization conversion unit 40 of this embodiment and the polarization conversion unit 80 shown in FIG. 9 is that in place of the plano-convex lens 25 arranged on the exit surface of the polarization beam splitter 31, a plano-concave lens 45 as a second optical element is arranged to have a flat surface which is in tight contact with the exit surface of a total reflection prism 42.

P-polarized light $L_P$ split by an active surface 41a of a polarization beam splitter 41 is reflected to the right (FIG. 12) at a right angle by a total reflection surface 42a of the total reflection prism 42, and emerges from the exit surface of the total reflection prism 42. At this time, the P-polarized light components $L_P$ emerging from the upper and lower end portions of the exit surface of the total reflection prism 42 emerge after they are diverged by the plano-concave lens 45, as indicated by broken lines. S-polarized light $L_S$ split by the active surface 41a of the polarization beam splitter 41 is converted into P-polarized light (converted P-polarized light $L_P*$) by a λ/4 optical phase plate 43 and a reflection plate 44, and then, the converted P-polarized light $L_P*$ emerges from the exit surface of the polarization beam splitter 41.

Therefore, in the polarization conversion unit 40 of this embodiment, even when the light amount per unit area of the converted P-polarized light $L_P*$ becomes smaller than the light amount per unit area of the P-polarized light $L_P$ due to the influences of reflection efficiency of the active surface 41a of the polarization beam splitter 41 with respect to the S-polarized light $L_S$, the wavelength dependency of the retardation amount of the λ/4 optical phase plate 43, the reflection loss of the reflection plate 44, and the like, since the P-polarized light $L_P$ emerges after it is diverged by the plano-concave lens 45, the insufficient light amount of the converted P-polarized light $L_P^*$ can be compensated for. Since the P-polarized light component $L_P$ emerging from the lower end (a junction portion with the polarization beam splitter 41) of the exit surface of the total reflection prism 42 is diverged by the plano-concave lens 45, it overlaps the converted P-polarized light component $L_P^*$ emerging from the upper end (a junction portion with the total reflection prism 42) of the exit surface of the polarization beam splitter 41. However, when a light source has a finite diameter, since the converted P-polarized light $L_P^*$ and the P-polarized light $L_P$ have finite spot sizes, no problem is posed.

Figure 13:
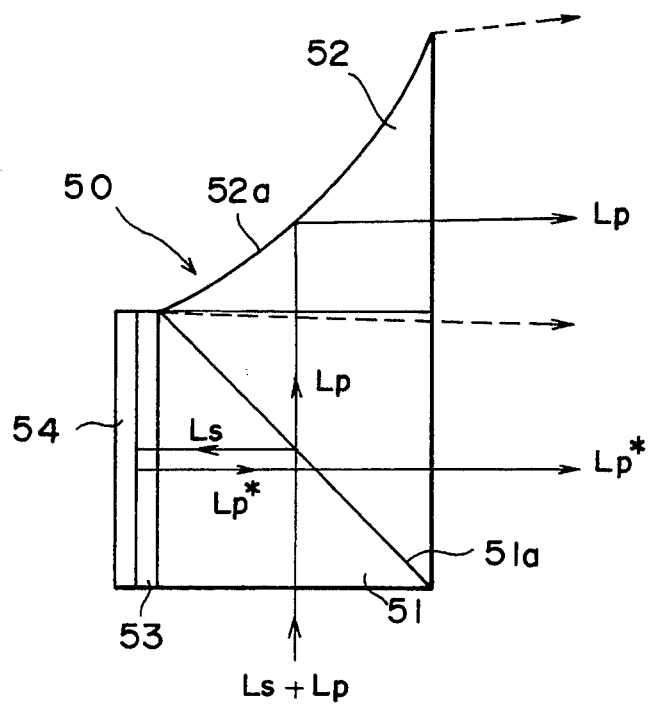
FIG. 13 is a schematic view showing still another embodiment of a polarization conversion unit according to the present invention.

FIG. 13 is a schematic view showing still another embodiment of a polarization conversion unit according to the present invention.

A difference between a polarization conversion unit 50 of this embodiment and the polarization conversion unit 40 shown in FIG. 12 is that the plano-concave lens 45 is not arranged on the exit surface of the total reflection prism 42, and the total reflection surface 42a of the total reflection prism 42 is defined by a convex curved surface with respect to the incident side of P-polarized light $L_P$ (i.e., the total reflection prism 42 serves as a second optical element).

P-polarized light $L_P$ split by an active surface 51a of a polarization beam splitter 51 is reflected to the right (FIG. 13) at a right angle by a total reflection surface 52a of a total reflection prism 52, and emerges from the exit surface of the total reflection prism 52. At this time, the P-polarized light components $L_P$ emerging from the upper and lower end portions of the exit surface of the total reflection prism 52 emerge after they are diverged by the total reflection surface 52a, as indicated by broken lines. S-polarized light $L_S$ split by the active surface 51a of the polarization beam splitter 51 is converted into P-polarized light (converted P-polarized light $L_P^*$) by a $\lambda/4$ optical phase plate 53 and a reflection plate 54, and thereafter, the converted P-polarized light $L_P^*$ emerges from the exit surface of the polarization beam splitter 51.

Figure 14:
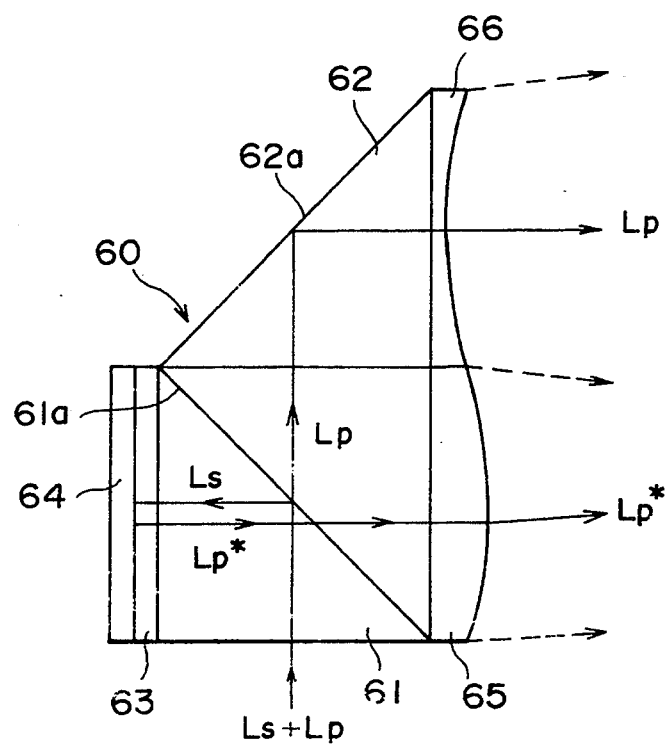
FIG. 14 is a schematic view showing still another embodiment of a polarization conversion unit according to the present invention.

FIG. 14 is a schematic view showing still another embodiment of a polarization conversion unit according to the present invention.

A difference between a polarization conversion unit 60 of this embodiment and the polarization conversion unit 80 shown in FIG. 9 is that a plano-concave lens 66 as a second optical element is arranged to have a flat surface, which is in tight contact with the exit surface of the total reflection prism 42.

P-polarized light $L_P$ split by an active surface 61a of a polarization beam splitter 61 is reflected to the right (FIG. 14) at a right angle by a total reflection surface 62a of a total reflection prism 62, and emerges from the exit surface of the total reflection prism 62. At this time, the P-polarized light components $L_P$ emerging from the upper and lower end portions of the exit surface of the total reflection prism 62 emerge after they are diverged by the plano-concave lens 66, as indicated by broken lines. S-polarized light $L_S$ split by the active surface 61a of the polarization beam splitter 61 is converted into P-polarized light (converted P-polarized light $L_P^*$) by a $\lambda/4$ optical phase plate 63 and a reflection plate 64, and thereafter, the converted P-polarized light $L_P^*$ emerges from the exit surface of the polarization beam splitter 61. At this time, the converted P-polarized light components $L_P^*$ emerging from the upper and lower end portions of the exit surface of the polarization beam splitter 61 emerge from a plano-convex lens 65 after they are converged, as indicated by broken lines.

Figure 15:
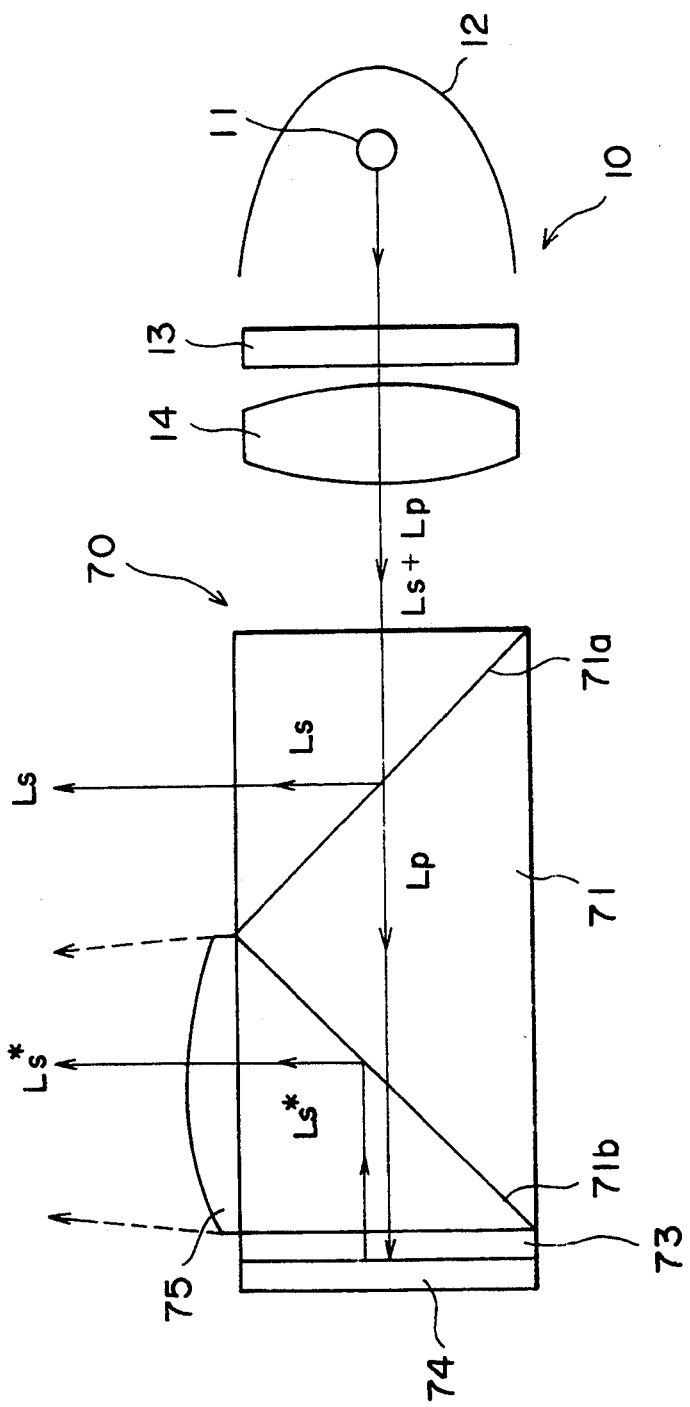
FIG. 15 is a schematic view showing still another embodiment of a polarization conversion unit according to the present invention.

FIG. 15 is a schematic view showing still another embodiment of a polarization conversion unit according to the present invention.

A difference between a polarization conversion unit 70 of this embodiment and the polarization conversion unit 80 shown in FIG. 9 is that S-polarized light $L_S$ and converted S-polarized light $L_S^*$ are output. More specifically, the polarization conversion unit 70 of this embodiment is constituted by a polarization beam splitter 71 having a first active surface (a deposition film formed on one of two inclined surfaces where three rectangular prisms are adhered) 71a, which transmits P-polarized light $L_P$ of collimated white light $L_S+L_P$ emitted from a light source unit 10, and reflects S-polarized light $L_S$ upward (FIG. 15) at a right angle, and a similar second active surface (a deposition film formed on the other one of the two inclined surfaces) 71b, one end of which contacts the first active surface 71a at a right angle, a $\lambda/4$ optical phase plate 73, one end of which contacts the other end of the second active surface 71b at an angle of 45°, and is adhered to the counter incident surface side of the polarization beam splitter 71, a reflection plate 74 having a reflection surface adhered to the $\lambda/4$ optical phase plate 73 at the side opposite to the polarization beam splitter 71, and a plano-convex lens 75 as a first optical element arranged to be in tight contact with the exit surface, at the side of the $\lambda/4$ optical phase plate 73, of the polarization beam splitter 71.

Collimated white light $L_S+L_P$ emerging from a condenser lens 14 is split into P-polarized light $L_P$ (first linearly polarized light) and S-polarized light $L_S$ (second linearly polarized light) since the P-polarized light $L_P$ is transmitted through the first active surface 71a of the polarization beam splitter 71, and the S-polarized light $L_S$ is reflected upward (FIG. 15) at a right angle by the first active surface 71a. The P-polarized light $L_P$ is transmitted through the second active surface 71b of the polarization beam splitter 71, is perpendicularly incident on the $\lambda/4$ optical phase plate 73, is then transmitted through the $\lambda/4$ optical phase plate 73, is reflected by the reflection surface of the reflection plate 74, and thereafter, is transmitted through the $\lambda/4$ optical phase plate 73 again. As a result, the plane of polarization of the P-polarized light $L_P$ is rotated through 90°, and the P-polarized light $L_P$ is converted into S-polarized light (converted S-polarized light $L_S^*$). The S-polarized light $L_S$ emerges from the exit surface, at the side of the light source unit 10, of the polarization beam splitter 71. The converted S-polarized light $L_S^*$ is reflected upward (FIG. 15) at a right angle by the second active surface 71b of the polarization beam splitter 71, and emerges from the exit surface, at the side of the $\lambda/4$ optical phase plate 73, of the polarization beam splitter 71. At this time, the converted S-polarized light components $L_S^*$ emerging from the left end portion (FIG. 15) and the central portion of the exit surface of the polarization beam splitter 71 emerge after they are converged by the plano-convex lens 75, as indicated by broken lines.

In the above description, the plano-convex lens 25 shown in FIG. 9 is arranged in tight contact with the exit surface of the polarization beam splitter 21, but may be integrated on the polarization beam splitter 21. Note that when the lens 25 is integrated on the polarization beam splitter 21, a surface reflection loss between optical members (i.e., between the polarization beam splitter 21 and the plano-convex lens 25) can be reduced. The same applies to the plano-concave lens 45 shown in FIG. 12, the plano-concave lens 66 and the plano-convex lens 65 shown in FIG. 14, and the plano-convex lens 75 shown in FIG. 15. The structure of the polarization conversion unit is not limited to a structure for rotating the plane of polarization of S-polarized light $L_S$ or P-polarized light $L_P$ using the $\lambda/4$ optical phase plate 23 and the reflection plate 24 like in the polarization conversion unit 80 shown in FIG. 9. For example, a $\lambda/2$ optical phase plate 322 may be used like in a polarization conversion unit shown in FIG. 1.

Still another embodiment of a projector constituted by combining the polarization conversion unit according to the present invention with other optical members will be described below.

Figure 16:
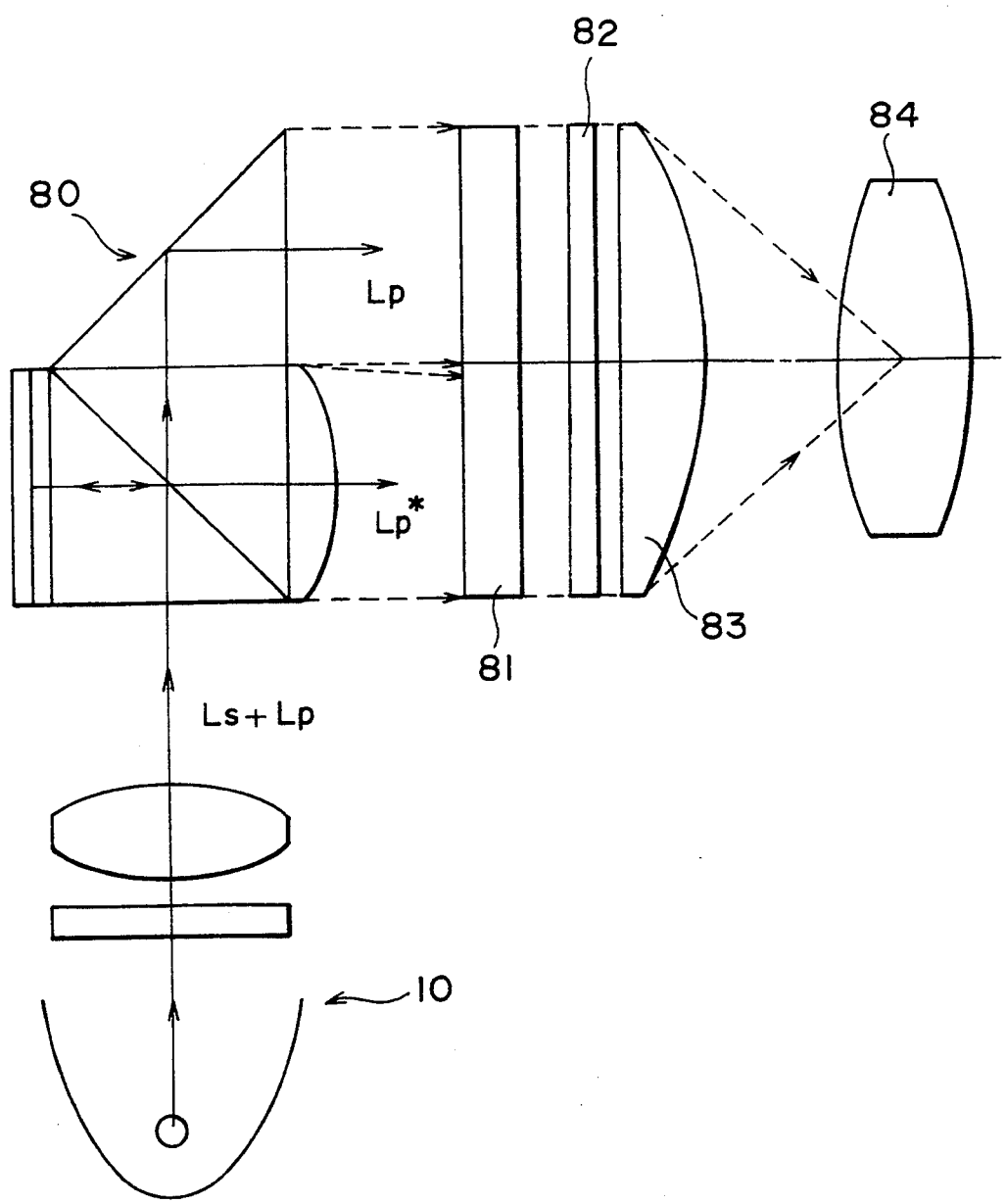
FIG. 16 is a view showing principal part of still another embodiment of a projector having the polarization conversion unit 20 shown in FIG. 9.

FIG. 16 is a view showing principal part of still another embodiment of a projector having the polarization conversion unit 80 shown in FIG. 9.

The projector of this embodiment is constituted by the light source unit 10 (FIG. 9) for emitting collimated white light $L_S+L_P$ (random polarized light), the polarization conversion unit 80 (FIG. 9) which splits the collimated white light $L_S+L_P$ emitted from the light source unit 10 into P-polarized light $L_P$ and S-polarized light $L_S$, which have planes of polarization that are perpendicular to each other, converts the S-polarized light $L_S$ into P-polarized light (converted P-polarized light $L_P$*) by rotating the plane of polarization of the S-polarized light $L_S$ so as to equalize the planes of polarization of the P-polarized light $L_P$ and the S-polarized light $L_S$, and separately outputs the P-polarized light $L_P$ and the converted P-polarized light $L_P$ *, a liquid crystal light valve 81 for receiving the P-polarized light $L_P$ and the converted P-polarized light $L_P$* separately emerging from the polarization conversion unit 80, a polarization plate 82 arranged to oppose the exit surface of the liquid crystal light valve 81, a projection plano-convex lens 83 arranged at the side, opposite to the liquid crystal light valve 81, of the polarization light plate 82 to have a flat surface at the side of the polarization plate 82, and a projection lens 84 arranged at the side, opposite to the polarization plate 82, of the projection plano-convex lens 83.

Collimated white light $L_S+L_P$ emitted from the light source unit 10 is split into two linearly polarized light components (P-polarized light $L_P$ and converted P-polarized light $L_P$*) by the polarization conversion unit 80, and these two polarized light components emerge from the unit 80. The P-polarized light $L_P$ and the converted P-polarized light $L_P$* emerging from the polarization conversion unit 80 are incident on the liquid crystal light valve 81, and are modulated by the liquid crystal light valve 81 according to an image signal to be converted into image light including P-polarized light and S-polarized light. The P-polarized light of the image light is transmitted through the polarization plate 82, and is then focused by the projection plano-convex lens 83 to form an optical image at the pupil position of the projection lens 84. The optical image is projected onto a screen (not shown) by the projection lens 84, thus projecting an image onto the screen.

Therefore, in the projector of this embodiment, since the liquid crystal light valve 81 can be uniformly illuminated by the polarization conversion unit 80 shown in FIG. 9, a difference in luminance of an image projected onto the screen (not shown) can be eliminated.

Note that the same effect as described above can be obtained when the polarization conversion unit 30, 40, 50, 60, or 70 shown in FIGS. 11 to 15 is used in place of the polarization conversion unit 80.

As described above, the present invention has the following effects. The polarization conversion unit of the present invention performs at least one of an operation for outputting first linearly polarized light after it is converged by a first optical element or an operation for outputting second linearly polarized light after it is diverged by a second optical element. Thus, the light amounts per unit area of the first and second linearly polarized light components can be equal to each other, and the liquid crystal light valve can be uniformly illuminated. In the projector of the present invention, since the liquid crystal light valve can be uniformly illuminated by the polarization conversion unit of the present invention, a difference in luminance of an image projected onto a screen can be eliminated.

Other embodiments which aim at realizing a compact structure of a polarization conversion unit according to the present invention will be described below with reference to FIG. 17 and subsequent drawings.

A planar polarization conversion unit 20 of this embodiment comprises a first incident-side prism $21_1$ having a triangular prism shape having a rectangular triangular section, first and second exit-side prisms $22_1$ and $22_2$, which are arranged at the two sides of the first incident-side prism $21_1$, so that their inclined surfaces contact those of the first incident-side prism $21_1$, and have the same shape as that of the first incident-side prism $21_1$, a second incident-side prism $21_2$, which is arranged at the side, opposite to the first incident-side prism $21_1$, of the first exit-side prism $22_1$, so that its inclined surface contacts with that of the first exit-side prism $22_1$, and has a shape corresponding to a half of the first incident-side prism $21_1$, and a third incident-side prism $21_3$, which is arranged at the side, opposite to the first incident-side prism $21_1$, of the second exit-side prism $22_2$, so that its inclined surface contacts with that of the second exit-side prism $22_2$, and has the same shape as that of the second incident-side prism $21_2$. The three incident-side prisms $21_1$ to $21_3$ and the two exit-side prisms $22_1$ and $22_2$ integrally constitute a single parallel flat plate.

The planar polarization conversion unit 20' also comprises the following constituting elements.

(1) Splitting Section

Figure 17:
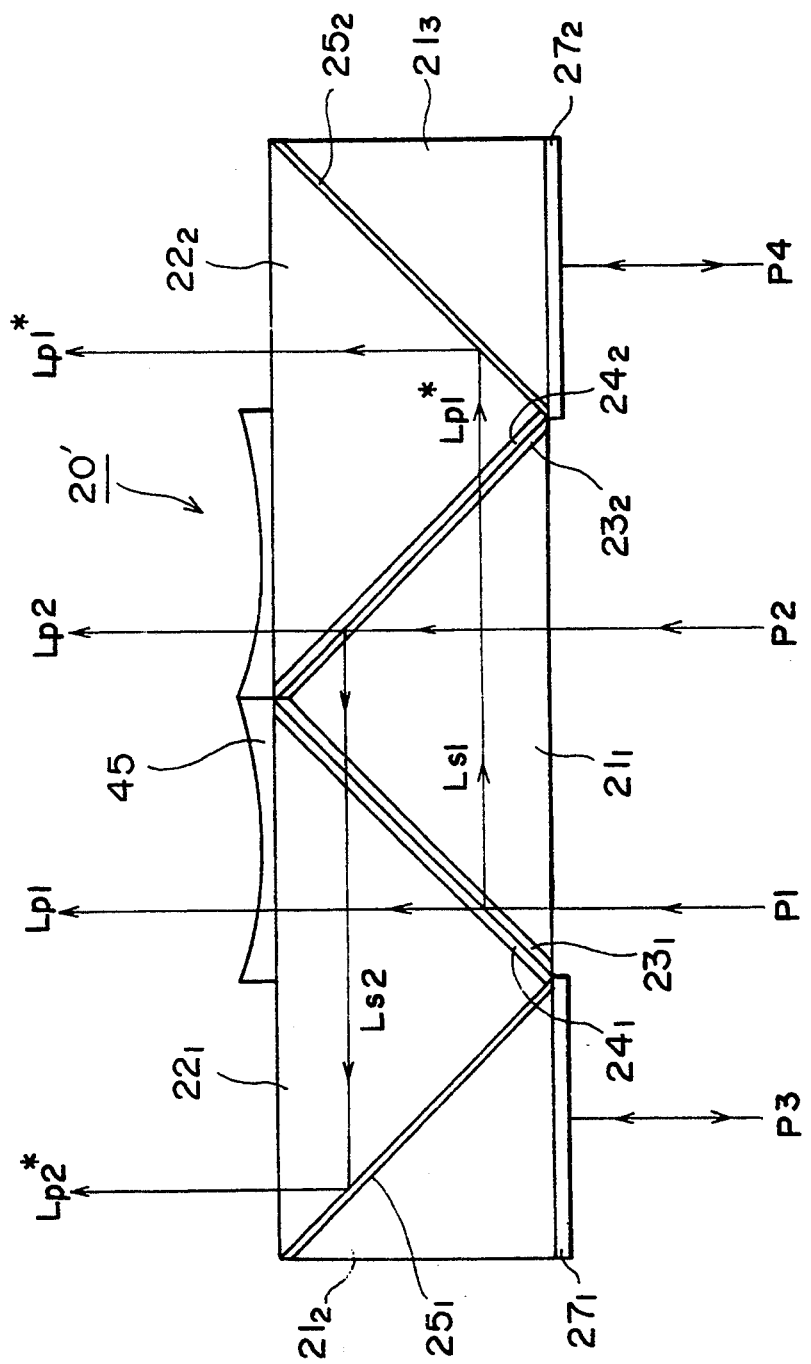
FIG. 17 is a view showing the first embodiment of a planar polarization conversion unit according to the present invention.

A first polarization splitting film $24_1$ formed at the side of the first exit-side prism $22_1$ on the contact surface between the first incident-side prism $21_1$ and the first exit-side prism $22_1$ and a second polarization splitting film $24_2$ formed at the side of the second exit-side prism $22_2$ on the contact surface between the first incident-side prism $21_1$ and the second exit-side prism $22_2$ serve as a splitting section for splitting non-polarized light (first and second incident light components $P_1$ and $P_2$ in FIG. 17) into reflection light (first and second S-polarized light components $L_{S1}$ and $L_{S2}$ in FIG. 17) and transmission light (first and second P-polarized light components $L_{P1}$ and $L_{P2}$ in FIG. 17), which light components have planes of polarization that are perpendicular to each other. The first and second polarization splitting films $24_1$ and $24_2$ have characteristics for reflecting S-polarized light having a plane of polarization parallel to their film surfaces, and transmitting P-polarized light having a plane of polarization perpendicular to their film surfaces. The contact surface between the first incident-side prism $21_1$ and the first exit-side prism $22_1$ and the contact surface between the first incident-side prism $21_1$ and the second exit-side prism $22_2$ serve as a pair of split surfaces, which are inclined at substantially the same angles with respect to non-polarized light, and oppose so that reflection light from one surface is directed toward the other surface.

(2) Change Section

A first λ/4 optical phase plate $23_1$ arranged at the side of the first incident-side prism $21_1$ on the contact surface between the first incident-side prism $21_1$ and the first exit-side prism $22_1$ and a second λ/4 optical phase plate $23_2$ arranged at the side of the first incident-side prism $21_1$ on the contact surface between the first incident-side prism $21_1$ and the second exit-side prism $22_2$ serve as a change section for changing the plane of polarization of at least one of reflection light and transmission light (the first and second S-polarized light components $L_{S1}$ and $L_{S2}$ in FIG. 17) to cause the planes of polarization of the reflection light and transmission light to coincide with each other. The first and second λ/4 optical phase plates $23_1$ and $23_2$ operate for light incident at an incident angle of 45° like the first and second incident light components $P_1$ and $P_2$, and their axial directions are selected to change S-polarized light into circularly polarized light.

(3) Reflection Section

A first total reflection mirror $25_1$ formed on the contact surface between the second incident-side prism $21_2$ and the first exit-side prism $22_1$ and a second total reflection mirror $25_2$ formed on the contact surface between the third incident-side prism $21_3$ and the second exit-side prism $22_2$ serve as a reflection section for reflecting one of reflection light and transmission light (the first and second S-polarized light components $L_{S1}$ and $L_{S2}$ in FIG. 17) to direct the reflected light in a direction substantially the same as the propagation direction of the other light (the first and second P-polarized light components $L_{P1}$ and $L_{P2}$ in FIG. 17).

(4) Reflection Means

Figure 18:
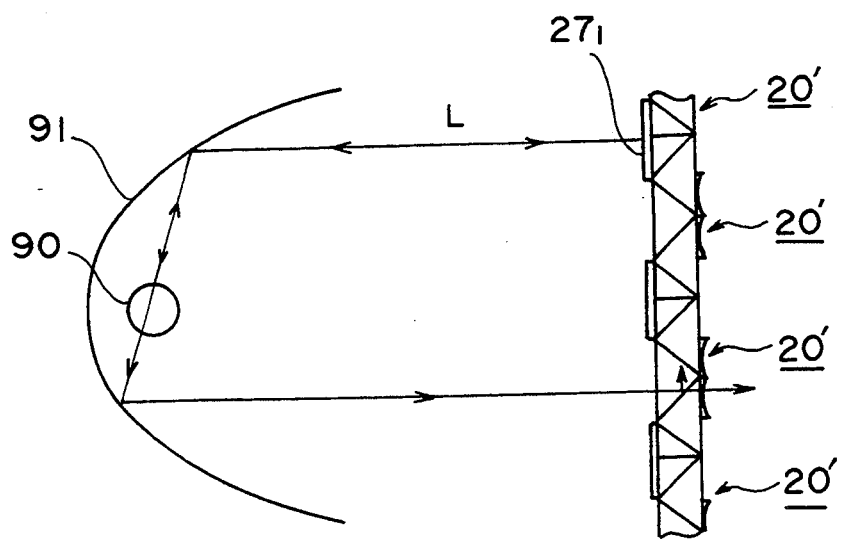
FIG. 18 is a view for explaining functions of first and second reflectors shown in FIG. 17.

A first reflector $27_1$ formed on the incident surface of the second incident-side prism $21_2$ and a second reflector $27_2$ formed on the incident surface of the third incident-side prism $21_3$ serve as reflection means for reflecting non-polarized light (third and fourth incident light components $P_3$ and $P_4$ in FIG. 17) incident on portions other than the above-mentioned splitting section, and returning the reflected light to a light source. More specifically, when a planar polarization conversion unit is constituted by aligning a plurality of planar polarization conversion units $20'$, as shown in FIG. 18, a parabolic reflection mirror 91 is arranged at the side opposite to a side, where the polarization conversion unit is arranged, of a light source 90 for emitting non-polarized light, and the light source 90 is arranged at a focal point position of the reflection mirror 91. Thus, non-polarized light L incident on the first reflector $27_1$, as indicated by a solid line, is reflected by the first reflector $27_1$ to return to the light source 90 along the same optical path. The returned light L is then reflected by the reflection mirror 91, and can be incident on the splitting section of another unit $20'$ constituting the planar polarization conversion unit. At this time, the non-polarized light returned to the light source 90 serves as a secondary light source although some light components thereof are diffused by the light source 90. The returned non-polarized light is reflected by the reflection mirror 91, and is output again as collimated light. In this manner, the returned non-polarized light is re-utilized. Note that in place of the reflection mirror 91, an elliptic mirror and a collimating optical element (a convex lens, a concave lens, a Fresnel lens, or the like) may be used, or a spherical mirror and a collimating optical element may be used.

The operation of the planar polarization conversion unit $20'$ of this embodiment will be described below with reference to FIG. 17.

First incident light $P_1$, which is incident at an incident angle of 45° on the contact surface between the first incident-side prism $21_1$ and the first exit-side prism $22_1$, and has a random plane of polarization, is transmitted through the first λ/4 optical phase plate $23_1$, and is then incident on the first polarization splitting film $24_1$. At this time, first P-polarized light $L_{P1}$ having a plane of polarization perpendicular to the film surface of the film $24_1$ is transmitted through the first polarization splitting film $24_1$, and first S-polarized light $L_{S1}$ having a plane of polarization parallel to the film surface of the film $24_1$ is reflected to the right (FIG. 17) at a right angle by the first polarization splitting film $24_1$. Thus, the first incident light $P_1$ is split into the first P-polarized light $L_{P1}$ and the first S-polarized light $L_{S1}$. The first P-polarized light $L_{P1}$ emerges from the exit surface of the first exit-side prism $22_1$. On the other hand, the first S-polarized light $L_{S1}$ is transmitted through the first λ/4 optical phase plate $23_1$ to be converted into circularly polarized light. Thereafter, the circularly polarized light is then transmitted through the second λ/4 optical phase plate $23_2$ to be converted into first converted P-polarized light $L_{P1}^*$ having a plane of polarization perpendicular to the film surface of the second polarization splitting film $24_2$. The first converted P-polarized light $L_{P1}^*$ is transmitted through the second polarization splitting film $24_2$, and thereafter, is reflected upward (FIG. 17) at a right angle by the second total reflection mirror $25_2$. The first converted P-polarized light $L_{P1}^*$ then emerges from the exit surface of the second exit-side prism $22_2$ in the same direction as the propagation direction of the first P-polarized light $L_{P1}$.

Second incident light $P_2$, which is incident at an incident angle of 45° on the contact surface between the first incident-side prism $21_1$ and the second exit-side prism $22_2$, and has a random plane of polarization, is transmitted through the second λ/4 optical phase plate $23_2$, and is then incident on the second polarization splitting film $24_2$. At this time, second P-polarized light $L_{P2}$ having a plane of polarization perpendicular to the film surface of the film $24_2$ is transmitted through the second polarization splitting film $24_2$, and second S-polarized light $L_{S2}$ having a plane of polarization parallel to the film surface of the film $24_2$ is reflected to the left (FIG. 17) at a right angle by the second polarization splitting film $24_2$. Thus, the second incident light $P_2$ is split into the second P-polarized light $L_{P2}$ and the second S-polarized light $L_{S2}$. The second P-polarized light $L_{P2}$ emerges from the exit surface of the second exit-side prism $22_2$. On the other hand, the second S-polarized light $L_{S2}$ is transmitted through the second λ/4 optical phase plate $23_2$ to be converted into circularly polarized light. Thereafter, the circularly polarized light is then transmitted through the first λ/4 optical phase plate $23_1$ to be converted into second converted P-polarized light $L_{P2}^*$ having a plane of polarization perpendicular to the film surface of the first polarization splitting film $24_1$.

The second converted P-polarized light $L_{P2}*$ is transmitted through the first polarization splitting film $24_1$, and thereafter, is reflected upward (FIG. 17) at a right angle by the first total reflection mirror $25_1$. The second converted P-polarized light $L_{P2}*$, then emerges from the exit surface of the first exit-side prism $22_1$ in the same direction as the propagation direction of the second P-polarized light $L_{P2}$.

Therefore, the planar polarization conversion unit $20'$, of this embodiment can change the first and second incident light components $P_1$ and $P_2$ incident on the first incident-side prism $21_1$ into the first and second P-polarized light components $L_{P1}$ and $L_{P2}$, and the first and second converted P-polarized light components $L_{P1}*$ and $L_{P2}*$ without any losses, and can output these changed light components from the entire exit surfaces.

The first reflector $27_1$ reflects third incident light $P_3$, which is incident at an incident angle of 45° on the contact surface between the first exit-side prism $22_1$ and the second incident-side prism $21_2$, and has a random plane of polarization, and returns it to the light source. The second reflector $27_2$ reflects fourth incident light $P_4$, which is incident at an incident angle of 45° on the contact surface between the second exit-side prism $22_2$ and the third incident-side prism $21_3$, and has a random plane of polarization, and returns it to the light source.

The materials of the constituting members of the planar polarization conversion unit $20'$ of this embodiment will be described below.

The first to third incident-side prisms $21_1$ to $21_3$ and the first and second exit-side prisms $22_1$ and $22_2$ can be formed of glass or plastic. However, these prisms are preferably formed of glass having a high degree of freedom upon selection of refractive index in order to maintain the optimal split function of the first and second polarization splitting films $24_1$ and $24_2$.

The first and second polarization splitting films $24_1$ and $24_2$ can be formed of known optical multi-layered films.

The first and second λ/4 optical phase plates $23_1$ and $23_2$ can be formed of materials, which can give a phase shift via the λ/4 optical phase plate with respect to a light beam incident at an incident angle of 45°, such as a material having crystallinity (e.g., mica, crystal, or the like), a stretched polymer film, a low-molecular liquid crystal oriented by aligning the molecular axes in a predetermined direction, a side-chain type polymer liquid crystal, a low-molecular liquid crystal dispersed in a polymer, and the like.

The first and second total reflection mirrors $25_1$ and $25_2$ can comprise aluminum deposition mirrors. Alternatively, the second and third incident-side prisms $21_2$ and $21_3$ may be omitted, and the inclined surfaces of the first and second exit-side prisms $22_1$ and $22_2$ at the side opposite to the first incident-side prism $21_1$ may be formed as air boundary surfaces.

The first and second reflectors $27_1$ and $27_2$ can comprise aluminum deposition mirrors, and the like.

Figure 19:
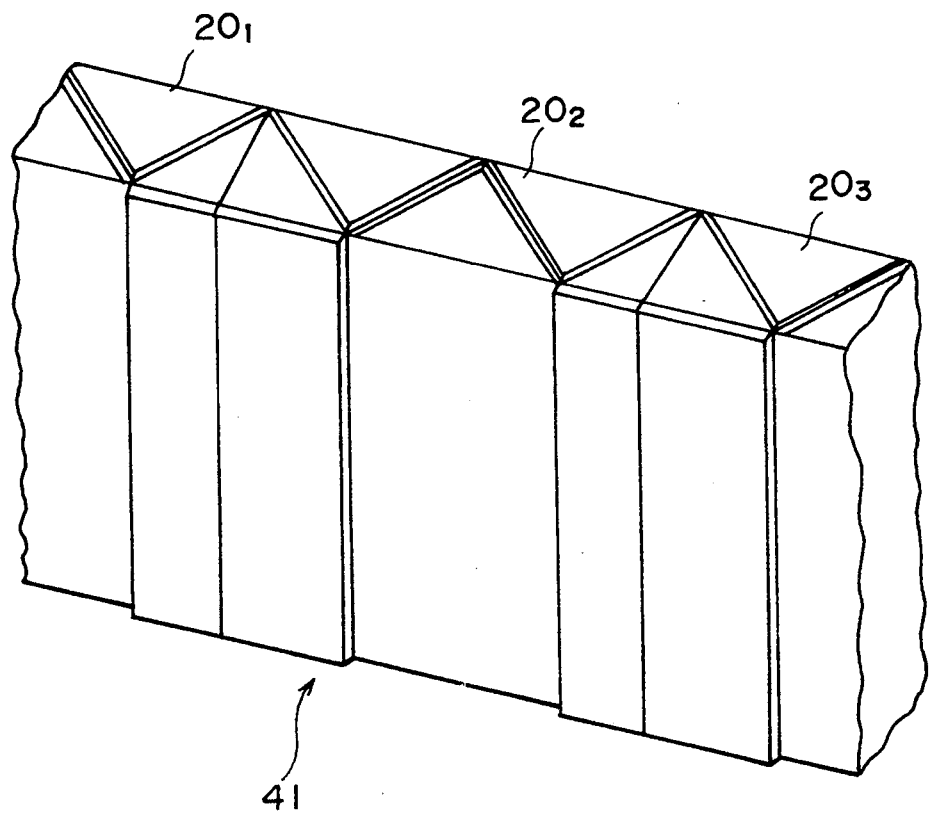
FIG. 19 is a partial view showing a structure of a planar polarization conversion unit constituted by aligning a plurality of units shown in FIG. 17.
Figure 20:
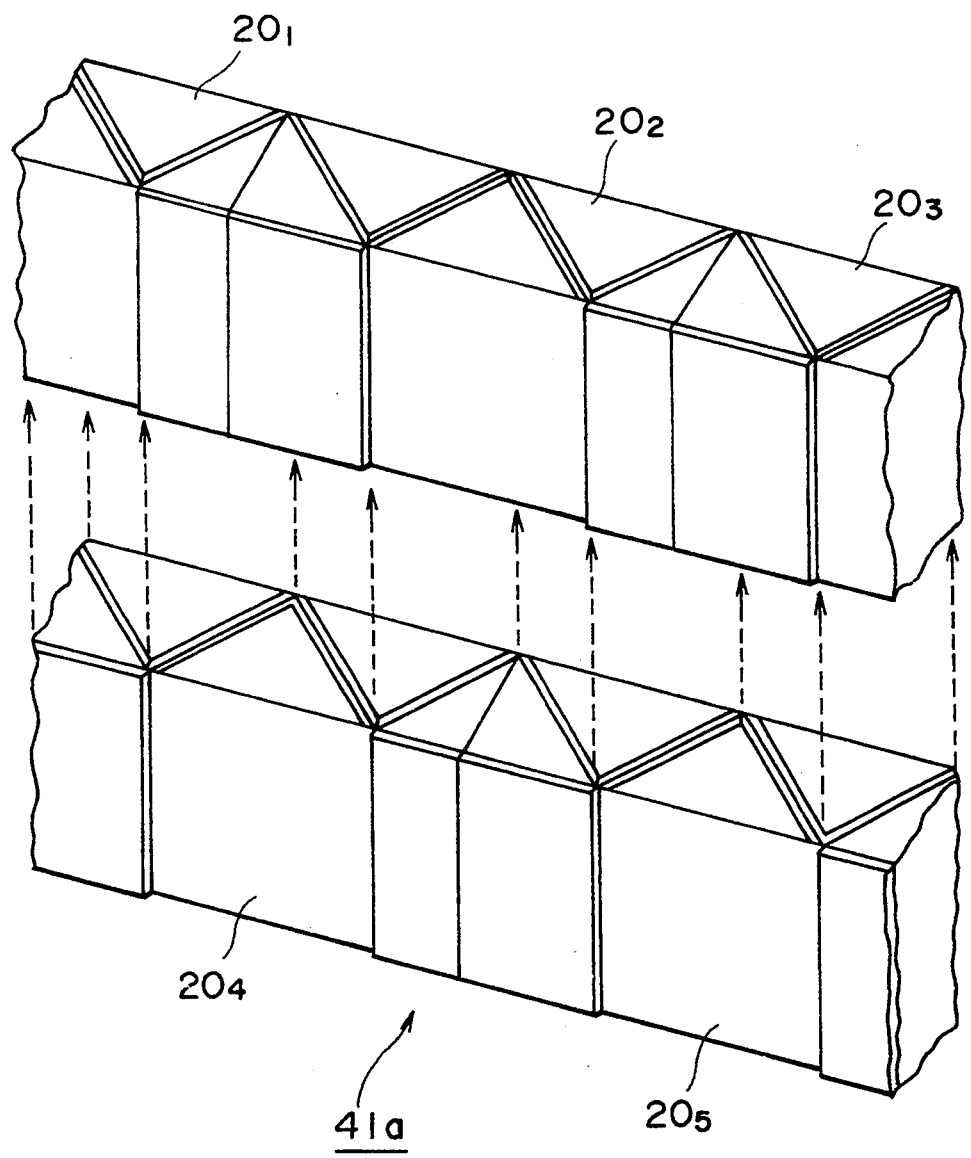
FIG. 20 is a partial view showing another structure of a planar polarization conversion unit constituted by aligning a plurality of units shown in FIG. 17.

A planar polarization conversion unit constituted by aligning a plurality of polarization conversion units $20'$ shown in FIG. 17 will be described below. 1 As a structure of a planar polarization conversion unit constituted by aligning a plurality of units $20'$, a planar polarization conversion unit 41 constituted by aligning a plurality of units $20'$ in the lateral direction, as shown in FIG. 19, is known. As another structure, as shown in FIG. 20, a planar polarization conversion unit $41a$, in which a plurality of arrays each constituted by aligning a plurality of units $20'$ in the lateral direction, are aligned so that adjacent arrays are shifted by half the pitch, is known. In the planar polarization conversion units 41 and $41a$ shown in FIGS. 19 and 20, incident-side prisms (the second and third incident-side prisms $21_2$ and $21_3$ shown in FIG. 17) serving as joint surfaces between two adjacent units, and the reflectors $27_1$ and $27_2$ may be integrally constituted.

Figure 21:
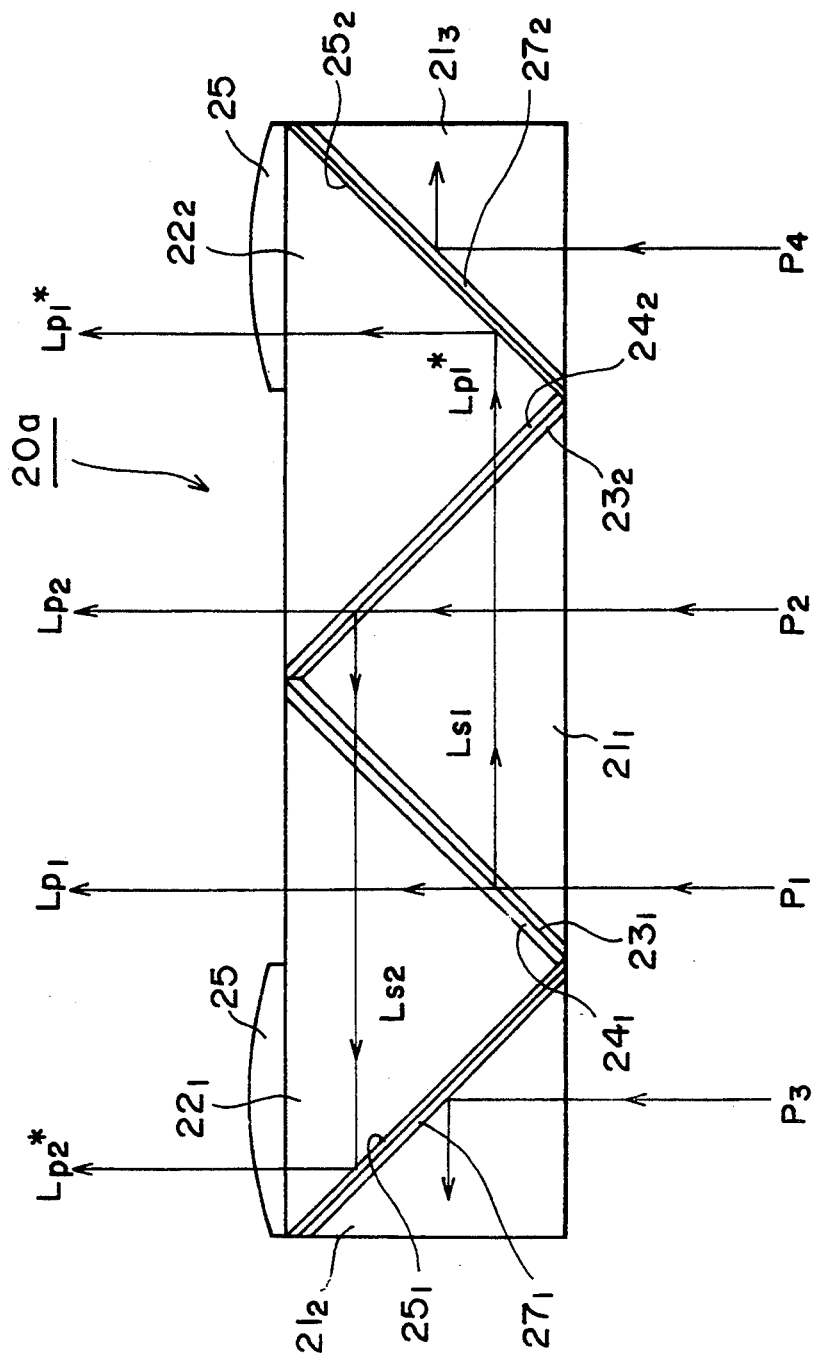
FIG. 21 is a view showing the second embodiment of a planar polarization conversion unit according to the present invention.

FIG. 21 is a view showing a structure of a planar polarization conversion unit $20a$ as another embodiment of a planar polarization conversion unit of the present invention.

A difference between the planar polarization conversion unit $20a$ of this embodiment and the planar polarization conversion unit $20'$ shown in FIG. 17 is that the first reflector $27_1$ is formed at the side of the second incident-side prism $21_2$ on the contact surface between the first exit-side prism $22_1$ and the second incident-side prism $21_2$, and the second reflector $27_2$ is formed at the side of the third incident-side prism $21_3$ on the contact surface between the second exit-side prism $22_2$ and the third incident-side prism $21_3$.

In the planar polarization conversion unit $20a$ of this embodiment, third incident light $P_3$ is reflected to the left (FIG. 21) by the first reflector $27_1$, and fourth incident light $P_4$ is reflected to the right (FIG. 21) by the second reflector $27_2$. As a result, when a planar polarization conversion unit is constituted by aligning a plurality of units $20a$, as shown in FIG. 18, the third incident light $P_3$ reflected by the first reflector $27_1$ can be reflected downward (FIG. 18) by the second reflector $27_2$ of a neighboring unit $20a$ (not shown) at the left side (FIG. 18) of the unit $20a$ shown in FIG. 21 to return to the light source. The fourth incident light $P_4$ reflected by the second reflector $27_2$ can be reflected downward (FIG. 18) by the first reflector $27_1$ of a neighboring unit $20a$ (not shown) at the right side (FIG. 18) of the unit $20a$ shown in FIG. 21 to return to the light source. When a single unit $20a$ is used, reflectors can be formed on two side surfaces of the unit $20a$, i.e., the outer surfaces of the second and third incident-side prisms $21_2$ and $21_3$, so that incident light components $P_3$ and $P_4$ can return to the reflection mirror 91 while propagating their optical paths in opposite directions.

In place of arranging the first and second reflectors $27_1$ and $27_2$, total reflection mirrors may be formed on the back surfaces of the first and second total reflection mirrors $25_1$ and $25_2$.

Figure 22:
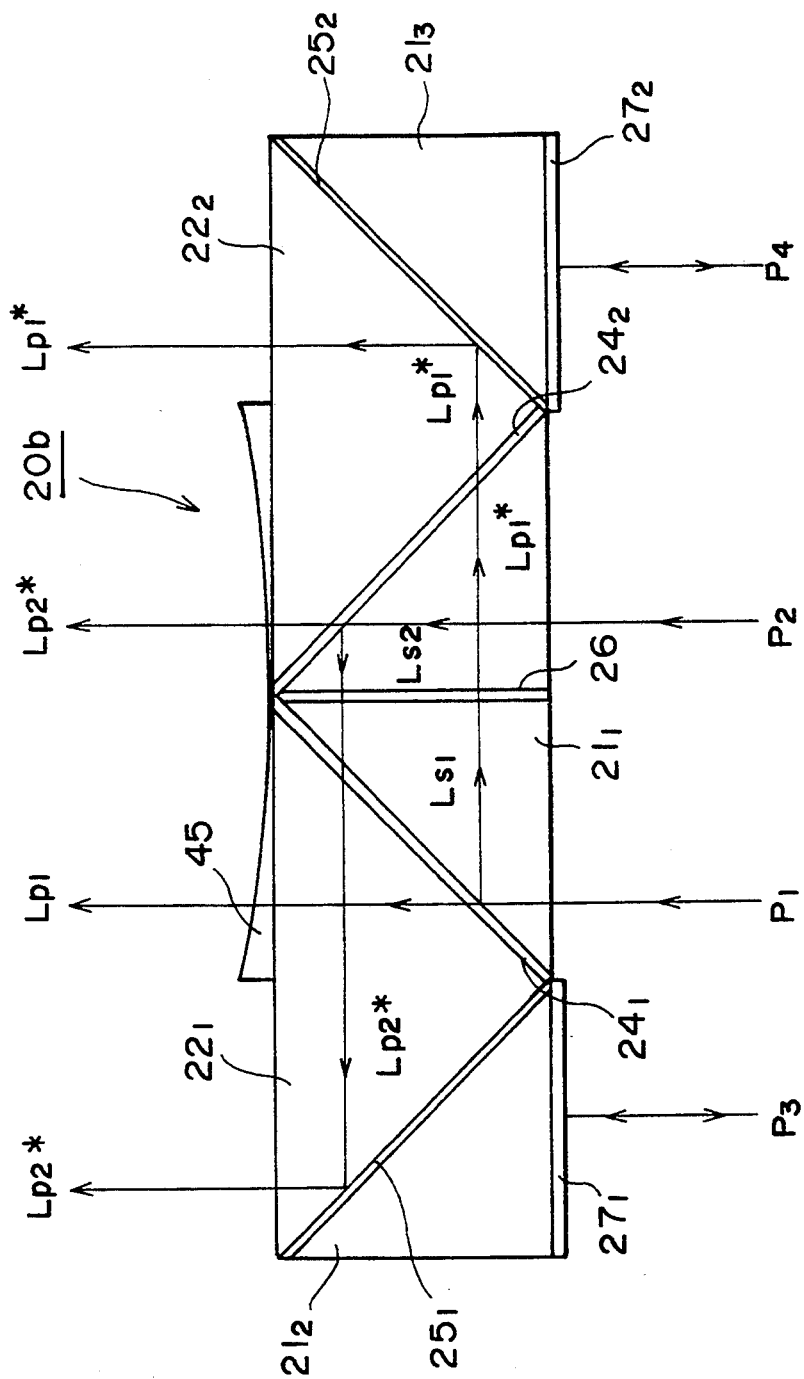
FIG. 22 is a view showing the third embodiment of a planar polarization conversion unit according to the present invention.

FIG. 22 is a view showing a structure of a planar polarization conversion unit $20b$ as still another embodiment of a planar polarization conversion unit of the present invention.

A difference between the planar polarization conversion unit $20b$ of this embodiment and the planar polarization conversion unit $20'$ shown in FIG. 17 is that in place of the first and second λ/4 optical phase plates $23_1$ and $23_2$, a λ/2 optical phase plate 26 is arranged at an intermediate position between the contact surface between the first incident-side prism $21_1$ and the first exit-side prism $22_1$ and the contact surface between the first incident-side prism $21_1$ and the second exit-side prism $22_2$.

In the planar polarization conversion unit $20b$ of this embodiment, first incident light $P_1$ is split into first P-polarized light $L_{P1}$ and first S-polarized light $L_{S1}$ since the first P-polarized light $L_{P1}$ is transmitted through the first polarization splitting film $24_1$ and the first S-polarized light $L_{S1}$ is reflected to the right (FIG. 22) at a right angle by the first polarization splitting film $24_1$. The first P-polarized light $L_{P1}$ emerges from the exit surface of the first exit-side prism $22_1$. On the other hand, the first S-polarized light $L_{S1}$ is transmitted through the λ/2 optical phase plate 26, and its plane of polarization is rotated through 90°. As a result, the first S-polarized light $L_{S1}$ is converted into first converted P-polarized light $L_{P1}^*$. The first converted P-polarized light $L_{P1}^*$ is transmitted through the second polarization splitting film $24_2$, and thereafter, is reflected upward (FIG. 22) at a right angle by the second total reflection mirror $25_2$. Thus, the first converted P-polarized light $L_{P1}^*$ emerges from the exit surface of the second exit-side prism $22_2$ in the same direction as the propagation direction of the first P-polarized light $L_{P1}$. Second incident light $P_2$ is split into second P-polarized light $L_{P2}$ and second S-polarized light $L_{S2}$ since the second P-polarized light $L_{P2}$ is transmitted through the second polarization splitting film $24_2$ and the second S-polarized light $L_{S2}$ is reflected to the left (FIG. 22) at a right angle by the second polarization splitting film $24_2$. The second P-polarized light $L_{P2}$ emerges from the exit surface of the second exit-side prism $22_2$. On the other hand, the second S-polarized light $L_{S2}$ is transmitted through the λ/2 optical phase plate 26, and its plane of polarization is rotated through 90°. As a result, the second S-polarized light $L_{S2}$ is converted into second converted P-polarized light $L_{P2}^*$. The second converted P-polarized light $L_{P2}^*$ is transmitted through the first polarization splitting film $24_1$, and is then reflected upward (FIG. 22) at a right angle by the first total reflection mirror $25_1$. Thereafter, the second converted P-polarized light $L_{P2}^*$ emerges from the exit surface of the first exit-side prism $22_1$ in the same direction as the propagation direction of the second P-polarized light $L_{P2}$.

Therefore, the planar polarization conversion unit 20b of this embodiment can change first and second incident light components $P_1$ and $P_2$ incident on the first incident-side prism $21_1$ into first and second P-polarized light components $L_{P1}$ and $L_{P2}$ and first and second converted P-polarized light components $L_{P1}^*$ and $L_{P2}^*$ without any losses, and can output these light components from the entire exit surfaces.

Third incident light $P_3$ is reflected by the first reflector $27_1$, and returns to the light source. Fourth incident light $P_4$ is reflected by the second reflector $27_2$, and returns to the light source.

Note that the λ/2 optical phase plate 26 may be arranged at any position between the contact surface between the first incident-side prism $21_1$ and the first exit-side prism $22_1$ and the contact surface between the first incident-side prism $21_1$ and the second exit-side prism $22_2$.

Figure 23:
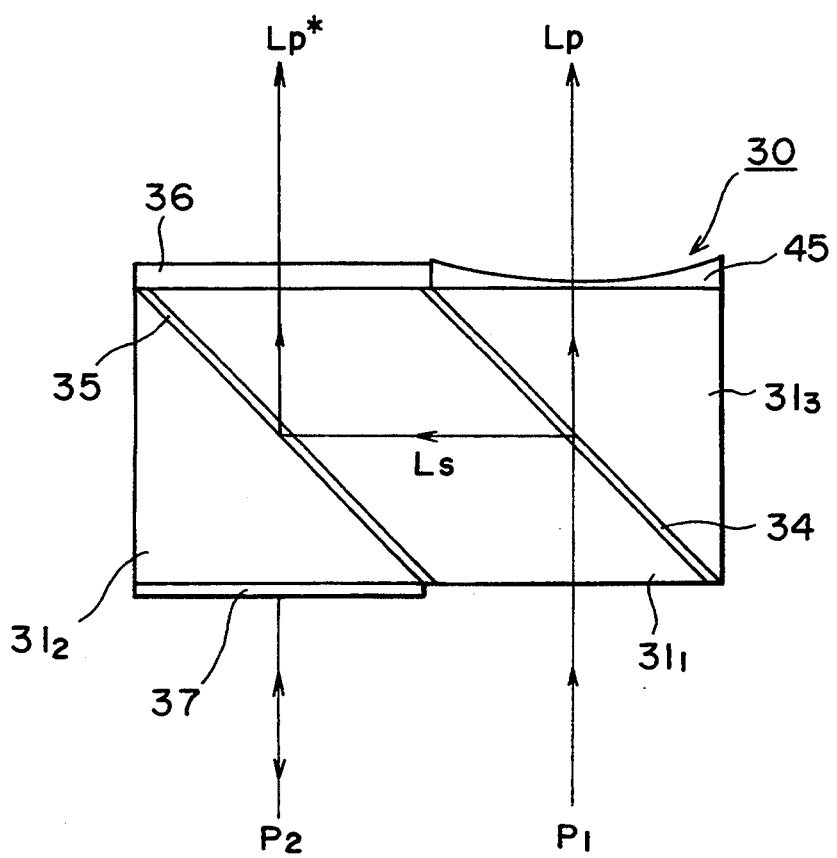
FIG. 23 is a view showing the fourth embodiment of a planar polarization conversion unit according to the present invention.

FIG. 23 is a view showing a structure of a planar polarization conversion unit 30 as still another embodiment of a planar polarization conversion unit of the present invention.

In the planar polarization conversion unit 30 of this embodiment, a splitting section (polarization splitting film 34) is obliquely arranged with respect to non-polarized light (first incident light $P_1$), a reflection section (total reflection film 35) is arranged to be parallel to the splitting section, and a λ/2 optical phase plate 36 as a change section is arranged in the optical path of reflection light (S-polarized light $L_S$), especially, the optical path of reflection light (S-polarized light $L_S$) reflected by the reflection section (total reflection film 35).

More specifically, the planar polarization conversion unit 30 of this embodiment comprises a first glass member $31_1$ having a parallelogram section, and second and third glass members $31_2$ and $31_3$, which are arranged at the two sides of the first glass member $31_1$ so that their inclined surfaces contact those of the first glass member $31_1$, and which have a rectangular-triangular section. The three glass members $31_1$ to $31_3$ integrally constitute a single parallel flat plate. The total reflection film 35 is formed on the contact surface between the first and second glass members $31_1$ and $31_2$, and the polarization splitting film 34 is formed on the contact surface between the first and third glass members $31_1$ and $31_3$. Furthermore, the λ/2 optical phase plate 36 is formed on the exit surface (a surface opposite to a surface on which first incident light $P_1$ is incident) of the first glass member $31_1$. The polarization splitting film 34 has characteristics for reflecting S-polarized light having a plane of polarization parallel to its film surface, and for transmitting P-polarized light having a plane of polarization perpendicular to its film surface. The λ/2 optical phase plate 36 has an effect for light incident at an incident angle of 90°.

Therefore, in the planar polarization conversion unit 30 of this embodiment, the polarization splitting film 34 serves as a splitting section for splitting incident light into reflection light (S-polarized light $L_S$) and transmission light (P-polarized light $L_P$), which have planes of polarization that are perpendicular to each other. The total reflection film 35 serves as a reflection section for reflecting one (S-polarized light $L_S$) of reflection light and transmission light to direct the reflected light in substantially the same direction as the propagation direction of the other light (P-polarized light $L_P$). Furthermore, the λ/2 optical phase plate 36 serves as a change section for changing the plane of polarization of at least one (S-polarized light $L_S$) of reflection light and transmission light to cause the planes of polarization of the reflection light and transmission light to coincide with each other.

A reflector 37 is formed on the incident surface of the second glass member $31_2$.

The operation of the planar polarization conversion unit 30 of this embodiment will be described below.

First incident light $P_1$, which is incident on the film surface of the polarization splitting film 34 at an incident angle of 45°, and has a random plane of polarization, is split into P-polarized light $L_P$ and S-polarized light $L_S$ since the P-polarized light $L_P$ having a plane of polarization perpendicular to the film surface of the film 34 is transmitted through the polarization splitting film 34, and the S-polarized light $L_S$ having a plane of polarization parallel to the film surface of the film 34 is reflected to the left (FIG. 23) at a right angle by the polarization splitting film 34. The P-polarized light $L_P$ emerges from the exit surface (a surface opposite to a surface on which the first incident light $P_1$ is incident) of the third glass member $31_3$. On the other hand, the S-polarized light $L_S$ is reflected upward (FIG. 23) at a right angle by the total reflection film 35, emerges from the exit surface of the second glass member $31_2$ in the same direction as the propagation direction of the P-polarized light $L_P$, and thereafter, is transmitted through the λ/2 optical phase plate 36. As a result, the plane of polarization of the S-polarized light $L_S$ is rotated through 90°, and the S-polarized light $L_S$ is converted into P-polarized light $L_P^*$. Therefore, the planar polarization conversion unit 30 of this embodiment can change the first incident light $P_1$ incident on the first glass member $31_1$ into the P-polarized light $L_P$ and the converted P-polarized light $L_P{}^*$ without any losses, and can output these light components from the entire exit surfaces.

On the other hand, second incident light $P_2$, which is incident on the total reflection film 35 at an incident angle of 45°, and has a random plane of polarization, is reflected by the reflector 37, and returns to a light source.

As an arrangement for constituting a planar polarization conversion unit by arranging a plurality of units 30 shown in FIG. 23, the arrangements shown in FIGS. 19 and 20 can be used as for the unit 20′ shown in FIG. 17.

When a planar polarization conversion unit is constituted by arranging a plurality of units 30, since it can be constituted by arranging a plurality of glass members having a parallelogram section, the unit 30 shown in FIG. 23 has better workability than the unit 20′ shown in FIG. 17. More specifically, the unit 30 can be easily manufactured in such a manner that a glass plate having a polarization splitting film 34 on one surface, and a glass plate having a total reflection film (e.g., an aluminum deposition film) on one surface are alternately stacked, the obtained multi-layered structure is cut at a section of 45°, the cut surfaces are optically polished, and thereafter, a $\lambda/2$ optical phase plate 36 is adhered.

Figure 24:
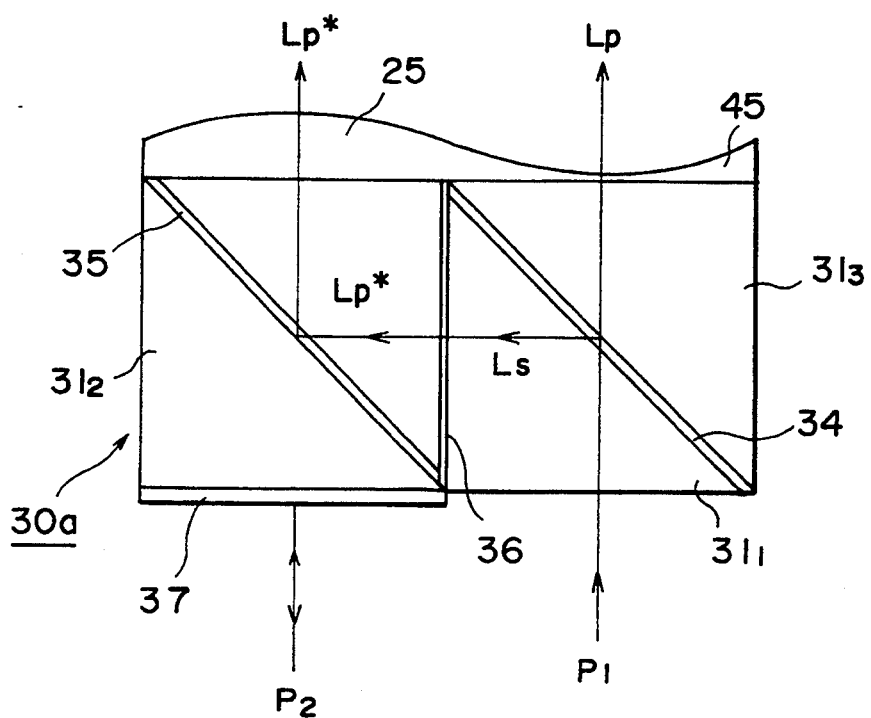
FIG. 24 is a view showing the fifth embodiment of a planar polarization conversion unit according to the present invention.

FIG. 24 is a view showing a structure of a planar polarization conversion unit 30a as still another embodiment of a planar polarization conversion unit of the present invention.

A difference between the planar polarization conversion unit 30a of this embodiment and the planar polarization conversion unit 30 shown in FIG. 23 is that the $\lambda/2$ optical phase plate 36 is arranged between the polarization splitting film 34 (splitting section) and the total reflection film 35 (reflection section).

In the planar polarization conversion unit 30a of this embodiment, first incident light $P_1$ is split into P-polarized light $L_P$ and S-polarized light $L_S$ since the P-polarized light $L_P$ is transmitted through the polarization splitting film 34, and the S-polarized light $L_S$ is reflected to the left (FIG. 24) at a right angle by the polarization splitting film 34. The P-polarized light $L_P$ emerges from the exit surface of the third glass member $31_3$. On the other hand, the S-polarized light $L_S$ is transmitted through the $\lambda/2$ optical phase plate 36, and its plane of polarization is rotated through 90°. Thus, the S-polarized light $L_S$ is converted into P-polarized light $L_P{}^*$. Thereafter, the P-polarized light $L_P{}^*$ is reflected upward (FIG. 24) at a right angle by the total reflection film 35, and emerges from the exit surface of the second glass member $31_2$ in the same direction as the propagation direction of the P-polarized light $L_P$. Therefore, the planar polarization conversion unit 30a of this embodiment can change the first incident light $P_1$ incident on the first glass member $31_1$ into the P-polarized light $L_P$ and the converted P-polarized light $L_P{}^*$ without any losses, and can output these light components from the entire exit surfaces.

On the other hand, second incident light $P_2$, which is incident on the total reflection film 35 at an incident angle of 45°, and has a random plane of polarization, is reflected by the reflector 37, and returns to a light source.

Figure 25:
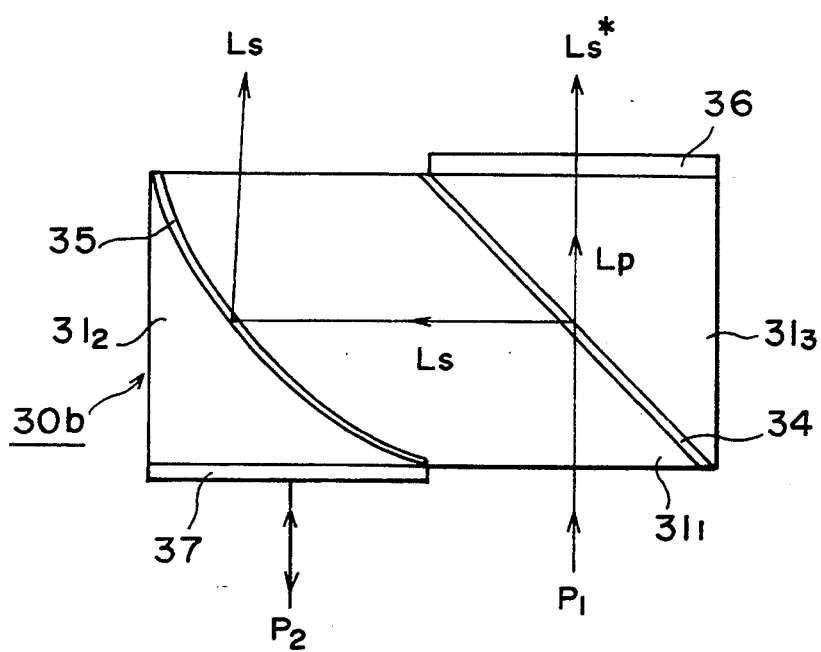
FIG. 25 is a view showing the sixth embodiment of a planar polarization conversion unit according to the present invention.

FIG. 25 is a view showing a structure of a planar polarization conversion unit 30b as still another embodiment of a planar polarization conversion unit of the present invention.

A difference between the planar polarization conversion unit 30b of this embodiment and the planar polarization conversion unit 30 shown in FIG. 23 is that the $\lambda/2$ optical phase plate 36 is adhered to the exit surface of the third glass member $31_3$ as the optical path of transmission light (P-polarized light $L_P$).

In the planar polarization conversion unit 30b of this embodiment, first incident light $P_1$ is split into P-polarized light $L_P$ and S-polarized light $L_S$ since the P-polarized light $L_P$ is transmitted through the polarization splitting film 34, and the S-polarized light $L_S$ is reflected to the left (FIG. 25) at a right angle by the polarization splitting film 34. The P-polarized light $L_P$ emerges from the exit surface of the third glass member $31_3$, and thereafter, is transmitted through the $\lambda/2$ optical phase plate 36. Thus, the plane of polarization of the P-polarized light $L_P$ is rotated through 90°, and the P-polarized light $L_P$ is converted into S-polarized light $L_S{}^*$. The S-polarized light $L_S{}^*$ then emerges from the plate 36. On the other hand, the S-polarized light $L_S$ is reflected upward (FIG. 25) at a right angle by the total reflection film 35, and emerges from the exit surface of the second glass member $31_2$ in the same direction as the propagation direction of the converted S-polarized light $L_S{}^*$. Therefore, the planar polarization conversion unit 30b of this embodiment can change the first incident light $P_1$ incident on the first glass member $31_1$ into the S-polarized light $L_S$ and the converted S-polarized light $L_S{}^*$ without any losses, and can output these light components from the entire exit surfaces.

On the other hand, second incident light $P_2$, which is incident on the total reflection film 35 at an incident angle of 45°, and has a random plane of polarization, is reflected by the reflector 37, and returns to a light source.

In the embodiments shown in FIGS. 17 to 25, polarized light $L_{P1}$, $L_{P2}$, $L_P$, or $L_S{}^*$, which emerges after it is transmitted through the polarization splitting film, and polarized light $L_{P1}{}^*$, $L_{P2}{}^*$, $L_P{}^*$, or $L_S$, which emerges after it is reflected by the polarization splitting film, have different optical path lengths before they emerge. In general, light emitted from a light source through a reflection mirror can never be perfectly collimated light and includes a non-collimated light component unless the light source is a strict point light source. Due to these drawbacks, since the polarized light $L_{P1}{}^*$, $L_{P2}{}^*$, $L_P{}^*$,3 or $L_S$ has a longer optical length than that of the polarized light $L_{P1}$, $L_{P2}$, $L_P$, or $L_S{}^*$, the luminance is decreased accordingly, and this results in a luminance nonuniformity.

In order to solve this problem, in the embodiments shown in FIGS. 17 to 25, an optical member is arranged at an exit port of polarized light like in the embodiments described previously.

More specifically, as can be seen from FIGS. 17 to 25, a concave lens for diverging light is arranged for polarized light having a shorter optical path length until it emerges, i.e., having a larger light amount per unit area than the other emerging light, and/or a convex lens for converging light is arranged for polarized light having a longer optical path length until it emerges, i.e., having a smaller light amount per unit area than the other emerging light.

In FIG. 17, concave lenses are arranged in the optical paths of polarized light components $L_{P1}$ and $L_{P2}$, so that the light amounts per unit area of these light components are set to be substantially equal to those of light components $L_{P1}{}^*$ and $L_{P2}{}^*$.

In FIG. 21, convex lenses are arranged in the optical paths of polarized light components $L_{P1}^*$ and $L_{P2}^*$, so that the light amounts per unit area of these light components are set to be substantially equal to those of light components $L_{P1}$ and $L_{P2}$.

In FIG. 22, the same function as in FIG. 17 is attained by a single lens, while two lenses are used in FIG. 17. This embodiment can prevent light components $L_{P1}$ and $L_{P2}$ having large light amounts per unit area from overlapping each other.

In FIG. 23, a concave lens is arranged in the optical path of polarized light $L_P$, so that the light amount per unit area of the light $L_P$ is set to be substantially equal to that of light $L_{P1}$.

In FIG. 24, a concave lens is arranged in the optical path of polarized light $L_P$, and a convex lens is arranged in the optical path of polarized light $L_P^*$, so that the light amounts per unit area of the polarized light components $L_P$ and $L_P^*$ are set to be substantially equal to each other.

In FIG. 25, the reflection surface of the total reflection film 35 in the optical path of polarized light $L_S$ is formed by a concave mirror, so that the polarized light $L_S$ is reflected to be slightly converged. Thus, the light amount per unit area of the polarized light $L_S$ is set to be substantially equal to that of light $L_S^*$. In the embodiment shown in FIG. 25, although the light amount per unit area of the polarized light $L_S$ is decreased due to an increase in optical path length, the light amount of the polarized light $L_S^*$, is decreased for the above-mentioned reason since it is transmitted through the $\lambda/2$ optical phase plate, and the curvature of the surface of the total reflection film 35 is preferably decreased accordingly. When a decrease in light amount of the polarized light $L_S^*$ is large, the surface of the total reflection film 35 may be formed by a convex mirror.

The combinations of optical members arranged at the exit port of the polarization conversion unit are not limited to those in the above embodiment. For example, an optical member of one embodiment may be combined with that of another embodiment.

In order to obtain polarized light having a high polarization ratio, a polarization plate may be arranged at the side of emerging light like in the embodiment shown in FIG. 8.

Figure 26:
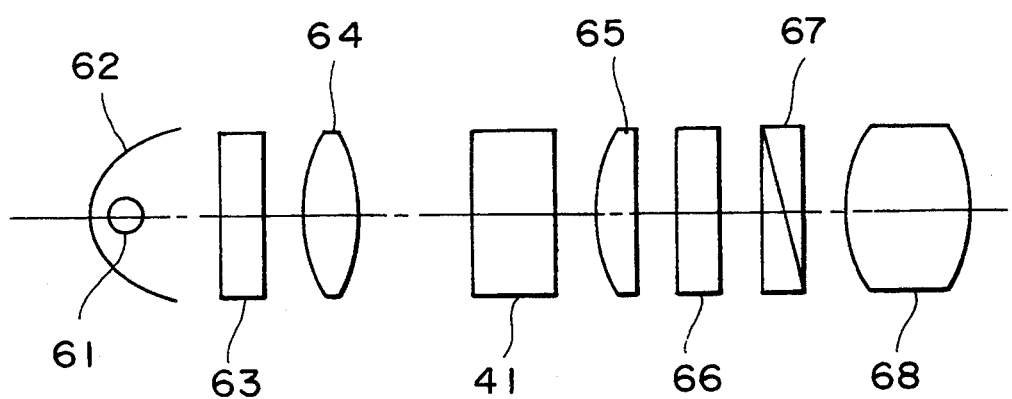
FIG. 26 is a schematic view showing still another embodiment of a projector according to the present invention.

FIG. 26 is a schematic view showing still another embodiment of a projector according to the present invention.

A difference between the projector of this embodiment and a conventional projector shown in FIG. 1 is that the planar polarization conversion unit 41 shown in FIG. 19 is used as an illumination optical system for converting collimated white light (non-polarized light) from a first condenser lens 64 into white linearly polarized light. In the projector of this embodiment, a second condenser lens 65 for focusing the white linearly polarized light from the planar polarization conversion unit 41 into the pupil of a projection lens 68 is arranged between the planar polarization conversion unit 41 and a liquid crystal light valve 66.

Since the projector of this embodiment illuminates the liquid crystal light valve 66 using the planar polarization conversion unit 41 as a planar polarization conversion unit of the present invention, white light (non-polarized light) emitted from a light source 61 can be incident on the liquid crystal light valve 66 without losses, and the distance from the light source 61 to the liquid crystal light valve 66 can be shortened. Thus, the compact structure of the projector can be realized.

Figure 27:
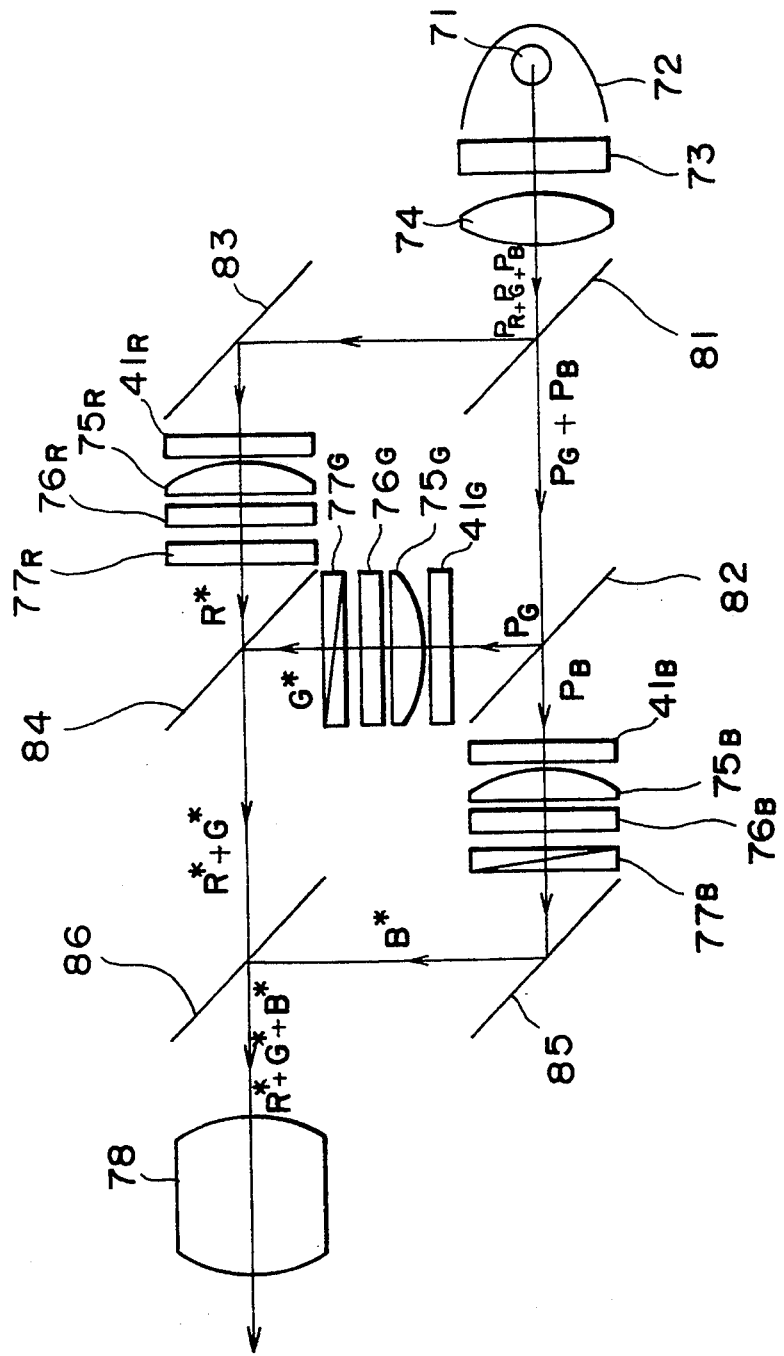
FIG. 27 is a schematic view showing still another embodiment of a projector according to the present invention.

FIG. 27 is a schematic view showing still another embodiment of a projector according to the present invention.

The projector of this embodiment comprises a light source 71 for emitting non-polarized light (white light), a reflection mirror 72, a heat cut filter 73, a first condenser lens 74, an illumination optical system for converting non-polarized light from the light source 71 into polarized light, an image generation unit for modulating the polarized light according to a video signal to generate an image, and a projection optical system for projecting an image.

The illumination optical system comprises a color separation system including first, second, and third separation dichroic mirrors 81, 82, and 83 for separating white light as non-polarized light into red, green, and blue non-polarized light components, red, green, and blue planar polarization conversion units $41_R$, $41_G$, and $41_B$, which are respectively arranged in the optical paths of the corresponding color non-polarized light components, and have the same arrangement as the planar polarization conversion unit 41 shown in FIG. 19, and red, green, and blue condenser lenses $75_R$, $75_G$, and $75_B$. The image generation unit comprises red, green, and blue liquid crystal light valves $76_R$, $76_G$, and $76_B$ as three generators for generating red, green, and blue color images. Furthermore, the projection optical system comprises a first synthesis dichroic mirror 84, a synthesis reflection mirror 85, a second synthesis dichroic mirror 86, and a projection lens 78.

In the projector of this embodiment, red non-polarized light $P_R$ is reflected upward (FIG. 27) at a right angle by the first separation dichroic mirror 81. Of cyan non-polarized light $P_G+P_B$ transmitted through the first separation dichroic mirror 81, blue non-polarized light $P_B$ is transmitted through the second separation dichroic mirror 82. Green non-polarized light $P_G$ is reflected upward (FIG. 27) at a right angle by the second separation dichroic mirror 82. In this manner, collimated white light $P_R+P_G+P_B$ as non-polarized light emerging from the first condenser lens 74 is separated into red, green, and blue non-polarized light components $P_R$, $P_G$, and $P_B$. Note that the red non-polarized light $P_R$ is reflected to the left (FIG. 27) at a right angle of the separation reflection mirror 83, and is then incident on the red planar polarization conversion unit $41_R$ to be converted into red polarized light. The green non-polarized light $P_G$ is reflected by the separation dichroic mirror 82, and is then incident on the green planar polarization conversion unit $41_G$ to be converted into green polarized light. The blue non-polarized light $P_B$ is transmitted through the second separation dichroic mirror 82, and is then incident on the blue polarization conversion unit $41_B$ to be converted into blue polarized light.

The red polarized light is incident on the red liquid crystal light valve $76_R$ through the red condenser lens $75_R$, and is modulated into a light beam including both P- and S-polarized light components by rotating its plane of polarization according to a red component of a color video signal. Furthermore, the light beam is converted into red image light R* as linearly polarized light by a red polarization plate $77_R$. Similarly, the green polarized light is converted into green image light G*, which is modulated according to a green component of the color video signal, upon operation of the green liquid crystal light valve 76$_G$ and a green polarization plate 77$_G$. The blue polarized light is converted into blue image light B*, which is modulated according to a blue component of the color video signal, upon operation of the blue liquid crystal light valve 76$_B$ and a blue polarization plate 77$_B$.

The red image light R* and the green image light G* are synthesized by the first synthesis dichroic mirror 84 to be converted into yellow image light R*+G*, and the yellow image light R*+G* is incident on the second synthesis dichroic mirror 86. The blue image light B* is reflected upward (FIG. 27) at a right angle by the synthesis reflection mirror 85, and is then incident on the second synthesis dichroic mirror 86. The yellow image light R*+G* is transmitted through the second synthesis dichroic mirror 86, and the blue image light B* is reflected to the left (FIG. 27) at a right angle by the second synthesis dichroic mirror 86. As a result, the yellow image light R*+G* and the blue image light B* are synthesized, and are converted into white image light R*+G*+B*, which is modulated according to the color video signal. The white image light R*+G*+B* is projected onto a screen (not shown) in an enlarged scale by the projection lens 78. Thus, a color image is projected onto the screen.

The projector of this embodiment has the following effects since the planar polarization conversion units are arranged in units of red, green, and blue non-polarized light components P$_R$, P$_G$, and P$_B$.

(1) It is difficult to set the wavelength dependency of an optical phase plate and a polarization splitting film (see FIG. 17) used in each minimum unit of the red, green, and blue planar polarization conversion units 41$_R$, 41$_G$, and 41$_B$ to be zero. For this reason, in place of using collimated white light P$_R$+P$_G$+P$_B$ as non-polarized light as incident light, red, green, and blue non-polarized light components P$_R$, R$_G$, and P$_B$ are preferably used as incident light to improve light utilization efficiency.

(2) In general, since the light source 71 has a finite diameter, white light emitted from the light source 71 always has a finite spread angle. When the beam size of light having a finite spread angle is compressed by any optical system, the spread angle is increased inversely proportional to the compression ratio of the beam size. Therefore, since the conventional projector shown in FIG. 1 has a large distance between the polarization conversion unit and a liquid crystal light valve 117, even when the beam size of light having a finite spread angle is compressed, focusing efficiency to the liquid crystal light valve 117 is decreased due to an increase in light spread angle. On the other hand, since the projector of this embodiment employs low-profile flat-plate-like planar polarization conversion units, the planar polarization conversion units can be arranged adjacent to the corresponding liquid crystal light valves. For this reason, a decrease in focusing efficiency to the liquid crystal light valves due to increases in spread angles of red, green, and blue non-polarized light components P$_R$, P$_G$, and P$_B$ can be prevented.

Still another embodiment of a projector of the present invention will be described below.

A difference between the projector of this embodiment and the projector shown in FIG. 27 is that a cyan planar polarization conversion unit is arranged between the first and second separation dichroic mirrors 81 and 82 (in a common optical path of green and blue non-polarized light components P$_G$ and P$_B$) in place of the green and blue planar polarization conversion units 41$_G$ and 41$_B$.

When a plurality of planar polarization conversion units are used, the planar polarization conversion units are preferably arranged at optically equivalent positions (positions where the propagation directions and amplitudes of light are equivalent to each other) in terms of utilization efficiency of light emitted from a light source and suppression of color nonuniformity. For this reason, the arrangement of the projector shown in FIG. 27 is preferable. However, when the number of parts is preferentially decreased, the arrangement of the projector of this embodiment may be adopted to decrease the number of planar polarization conversion units. In this case, the utilization efficiency of light can be improved as compared to the conventional projector, and the overall apparatus can be rendered compact.

In the projector shown in FIG. 27, as the planar polarization conversion units 41$_R$, 41$_G$, and 41$_B$, planar polarization-conversion units comprising units 20$a$, 20$b$, 30, 30$a$, or 30$b$ shown in FIGS. 21 to 25 or planar polarization conversion units 41$a$ shown in FIG. 20 may be used.

The arrangement of the projector of the present invention is not limited to those shown in FIGS. 26 and 27. For example, in a projector in which white light is separated into color light components using color filters, and the color light components modulated by liquid crystal light valves are synthesized by a cubic prism, as disclosed in Japanese Laid-Open Patent Application No. 62-59919, the planar polarization conversion units 41 shown in FIG. 19 may be arranged in correspondence with the color filters. In addition, in a projector in which white light is separated into color light components by a first cubic prism, and the color light components modulated by reflection type liquid crystal light valves are synthesized by a second cubic prism, as disclosed in Japanese Laid-Open Patent Application No. 62-1391, the planar polarization conversion units 41 shown in FIG. 19 may be arranged in correspondence with the exit planes of the color light components of the first cubic prism.

What is claimed is:

1. A polarization conversion unit, which splits light into a pair of polarized light components having different polarization states, causes the polarization states of the pair of split polarized light components to coincide with each other, respectively outputs the pair of polarized light components having the coinciding polarization states, and illuminates a surface to be illuminated, comprising:

converging means for converging each of said pair of polarized light components onto a converging point, wherein said converging means has an optical axis which is between central rays of said pair of polarized light components, wherein said converging point is farther than the surface to be illuminated.

2. A unit according to claim 1, further comprising a polarization plate, which is arranged in an optical path of the pair of polarized light components propagating through said converging means, and has a polarization axis to transmit the pair of polarized light components.

3. A projector comprising:

a light source;

a polarization conversion unit for splitting light emitted from said light source into a pair of polarized light components having different polarization states, causing the polarization states of the pair of split polarized light components to coincide with each other, and respectively outputting the pair of polarized light components having the coinciding polarization states, said polarization conversion unit having converging means for converging each of said pair of polarized light components onto a converging point, wherein said converging means has an optical axis which is between central rays of said pair of polarized light components, wherein said converging point is farther than the surface to be illuminated;

an image generator for modulating the pair of polarized light components emerging from said polarization conversion unit to generate an image; and a projection optical system for projecting the image.

4. A projector according to claim 3, further comprising a polarization plate, which is arranged in an optical path of the pair of polarized light components propagating through said converging means, and between said converging means and said image generator, and has a polarization axis to transmit the pair of polarized light components.

5. A polarization conversion unit for splitting light into a pair of polarized light components having different polarization states, causing the polarization states of the pair of split polarized light components to coincide with each other, and separately outputting the pair of polarized light components having the coinciding polarization states, comprising at least one of:

a first optical element for converging the polarized light component having a smaller light amount per unit sectional area than that of the other polarized light component of the pair of polarized light components, and a second optical element for diverging the polarized light component having a larger light amount per unit sectional area than that of the other polarized light component of the pair of polarized light components.

6. A unit according to claim 5, further comprising a polarization plate, which is arranged in an optical path of the pair of emerging polarized light components, and has an optical axis to transmit both the polarized light components.

7. A projector comprising:
a light source;
a polarization conversion unit for splitting light emitted from said light source into a pair of polarized light components having different polarization states, causing the polarization states of the pair of split polarized light components to coincide with each other, and separately outputting the pair of polarized light components having the coinciding polarization states, said polarization conversion unit having at least one of a first optical element for converging the polarized light component having a smaller light amount per unit sectional area than that of the other polarized light component of the pair of polarized light components, and a second optical element for diverging the polarized light component having a larger light amount per unit sectional area than that of the other polarized light component of the pair of polarized light components;

an image generator for modulating the pair of emerging polarized light components to generate an image; and a projection optical system for projecting the image.

8. A projector according to claim 7, further comprising a polarization plate, which is arranged in an optical path of the pair of polarized light components emerging from said polarization conversion unit, and has an optical axis to transmit both the polarized light components.

9. A polarization illumination apparatus comprising:
illumination means for emitting light;
a pair of polarization splitting surfaces for splitting some light components of the light into reflection light and transmission light, which have different polarization states, said pair of polarization splitting surfaces being obliquely arranged in an optical path of the light to face each other, so that one end of one polarization splitting surface contacts one end of the other polarization splitting surface;

a pair of $\lambda/4$ optical phase plates for changing the polarization state of the reflection light to cause the polarization states of the reflection light and the transmission light to coincide with each other, said pair of $\lambda/4$ optical phase plates being arranged at an incident side of the light of said pair of polarization splitting surfaces to be substantially parallel to said pair of polarization splitting surfaces, respectively;

a pair of reflection surfaces for reflecting the reflection light from one of said pair of polarization splitting surfaces in substantially the same direction as a propagation direction of the transmission light through said pair of $\lambda/4$ optical phase plates and the other polarization splitting surface, said pair of reflection surfaces being arranged to sandwich said pair of polarization splitting surfaces therebetween;

reflectors for reflecting remaining light components of the light incident on a portion other than said pair of polarization splitting surfaces, and returning the reflected light components to said illumination means, said reflectors being arranged to be perpendicular to the light emitted from said illumination means and at a side, facing said illumination means, of said reflection surfaces; and an optical element comprising at least one of a first optical element, arranged in an optical path of the reflection light, for converging the reflection light, and a second optical element, arranged in an optical path of the transmission light, for diverging the reflection light.

10. A projector comprising:
illumination means for emitting light;
a pair of polarization splitting surfaces for splitting some light components of the light into reflection light and transmission light, which have different polarization states, said pair of polarization splitting surfaces being obliquely arranged in an optical path of the light to face each other, so that one end of one polarization splitting surface contacts one end of the other polarization splitting surface;

a pair of $\lambda/4$ optical phase plates for changing the polarization state of the reflection light to cause the polarization states of the reflection light and the transmission light to coincide with each other, said pair of $\lambda/4$ optical phase plates being arranged at an incident side of the light of said pair of polarization splitting surfaces to be substantially parallel to said pair of polarization splitting surfaces, respectively;

a pair of reflection surfaces for reflecting the reflection light from one of said pair of polarization splitting surfaces in substantially the same direction as a propagation direction of the transmission light through said pair of λ/4 optical phase plates and the other polarization splitting surface, said pair of reflection surfaces being arranged to sandwich said pair of polarization splitting surfaces therebetween;

reflectors for reflecting remaining light components of the light incident on a portion other than said pair of polarization splitting surfaces, and returning the reflected light components to said illumination means, said reflectors being arranged to be perpendicular to the light emitted from said illumination means and at a side, facing said illumination means, of said reflection surfaces;

an optical element comprising at least one of a first optical element, arranged in an optical path of the reflection light, for converging the reflection light, and a second optical element, arranged in an optical path of the transmission light, for diverging the reflection light;

an image generator for modulating the reflection light and the transmission light having the coinciding polarization state to generate an image; and a projection optical system for projecting the image.

11. A polarization illumination apparatus comprising:
illumination means for emitting light; and
a planar polarization conversion unit constituted by a plurality of units which are arranged along a common plane crossing the light,
each of said units comprising
a pair of polarization splitting surfaces for splitting some light components of the light into reflection light and transmission light, which have different polarization states, said pair of polarization splitting surfaces being obliquely arranged in an optical path of the light to face each other, so that one end of one polarization splitting surface contacts one end of the other polarization splitting surface, a pair of λ/4 optical phase plates for changing the polarization state of the reflection light to cause the polarization states of the reflection light and the transmission light to coincide with each other, said pair of λ/4 optical phase plates being arranged at an incident side of the light of said pair of polarization splitting surfaces to be substantially parallel to said pair of polarization splitting surfaces, respectively, a pair of reflection surfaces for reflecting the reflection light from one of said pair of polarization splitting surfaces in substantially the same direction as a propagation direction of the transmission light through said pair of λ/4 optical phase plates and the other polarization splitting surface, said pair of reflection surfaces being arranged to sandwich said pair of polarization splitting surfaces therebetween, reflectors for reflecting remaining light components of the light incident on a portion other than said pair of polarization splitting surfaces, and returning the reflected light components to said illumination means, and an optical element comprising at least one of a first optical element, arranged in an optical path of the reflection light, for converging the reflection light, and a second optical element, arranged in an optical path of the transmission light, for diverging the reflection light.

12. An apparatus according to claim 11, wherein said reflectors are arranged to be perpendicular to the light emitted from said illumination means and at a side, facing said illumination means, of said reflection surfaces.

13. An apparatus according to claim 11, wherein said reflectors are arranged on a back side of said reflection surfaces to be parallel to said reflection surfaces.

14. A projector comprising:
illumination means for emitting light;
a planar polarization conversion unit constituted by a plurality of units which are arranged along a common plane crossing the light,
each of said units comprising
a pair of polarization splitting surfaces for splitting some light components of the light into reflection light and transmission light, which have different polarization states, said pair of polarization splitting surfaces being obliquely arranged in an optical path of the light to face each other, so that one end of one polarization splitting surface contacts one end of the other polarization splitting surface, a pair of λ/4 optical phase plates for changing the polarization state of the reflection light to cause the polarization states of the reflection light and the transmission light to coincide with each other, said pair of λ/4 optical phase plates being arranged at an incident side of the light of said pair of polarization splitting surfaces to be substantially parallel to said pair of polarization splitting surfaces, respectively, a pair of reflection surfaces for reflecting the reflection light from one of said pair of polarization splitting surfaces in substantially the same direction as a propagation direction of the transmission light through said pair of λ/4 optical phase plates and the other polarization splitting surface, said pair of reflection surfaces being arranged to sandwich said pair of polarization splitting surfaces therebetween, reflectors for reflecting remaining light components of the light incident on a portion other than said pair of polarization splitting surfaces, and returning the reflected light components to said illumination means, and an optical element comprising at least one of a first optical element, arranged in an optical path of the reflection light, for converging the reflection light, and a second optical element, arranged in an optical path of the transmission light, for diverging the reflection light;

an image generator for modulating a pair of modulated light components emerging from said planar polarization conversion unit to generate an image; and a projection optical system for projecting the image.

15. A projector according to claim 14, wherein said reflectors are arranged to be perpendicular to the light emitted from said illumination means and at a side, facing said illumination means, of said reflection surfaces.

16. A projector according to claim 14, wherein said reflectors are arranged on a back side of said reflection surfaces to be parallel to said reflection surfaces.

17. A polarization illumination apparatus comprising:
illumination means for emitting light; and
a planar polarization conversion unit constituted by a plurality of units which are arranged along a common plane crossing the light,
each of said units comprising
- a pair of polarization splitting surfaces for splitting some light components of the light into reflection light and transmission light, which have different polarization states, said pair of polarization splitting surfaces being obliquely arranged in an optical path of the light to face each other, so that one end of one polarization splitting surface contacts one end of the other polarization splitting surface,
- a pair of λ/2 optical phase plates for changing the polarization state of the reflection light to cause the polarization states of the reflection light and the transmission light to coincide with each other, said pair of λ/2 optical phase plates being arranged between said pair of polarization splitting surfaces,
- a pair of reflection surfaces for reflecting the reflection light from one of said pair of polarization splitting surfaces in substantially the same direction as a propagation direction of the transmission light through said pair of λ/2 optical phase plates and the other polarization splitting surface, said pair of reflection surfaces being arranged to sandwich said pair of polarization splitting surfaces therebetween,
- reflectors for reflecting remaining light components of the light incident on a portion other than said pair of polarization splitting surfaces, and returning the reflected light components to said illumination means, and
- an optical element comprising at least one of a first optical element, arranged in an optical path of the reflection light, for converging the reflection light, and a second optical element, arranged in an optical path of the transmission light, for diverging the reflection light.

18. A polarization illumination apparatus comprising:
illumination means for emitting light; and
a planar polarization conversion unit constituted by a plurality of units which are arranged along a common plane crossing the light,
each of said units comprising
- a polarization splitting surface for splitting some light components of the light into reflection light and transmission light having different polarization states, said polarization splitting surface being obliquely arranged in an optical path of the light,
- a λ/2 optical phase plate for causing the polarization states of the reflection light and the transmission light to coincide with each other, said λ/2 optical phase plate being arranged in an optical path of one of the reflection light and the transmission light,
- a reflection surface for reflecting the reflection light from said polarization splitting surface in a direction substantially the same as a propagation direction of the transmission light, said reflection surface being arranged to be almost parallel to said polarization splitting surface,
- a reflector for reflecting remaining light components of the light incident on a portion other than said polarization splitting surface, and returning the reflected light components to said illumination means, and
- an optical element comprising at least one of a first optical element, arranged in an optical path of the reflection light, for converging the reflection light, and a second optical element, arranged in an optical path of the transmission light, for diverging the reflection light.

19. An apparatus according to claim 18, wherein said λ/2 optical phase plate is arranged in an optical path of the reflection light reflected by said reflection surface.

20. An apparatus according to claim 18, wherein said λ/2 optical phase plate is arranged between said polarization splitting surface and said reflection surface.

21. A projector comprising:
illumination means for emitting light;
a color separation system for separating the light from said illumination light into red, green, and blue color light components;
three planar polarization conversion units, which correspond to the color light components, and each of which is constituted by a plurality of units arranged along a common plane crossing the corresponding color light component,
each of said units comprising
- a polarization splitting surface for splitting some light components of the light into reflection light and transmission light having different polarization states,
- an optical phase plate for changing the polarization state of at least one of the reflection light and the transmission light to cause the polarization states of the reflection light and the transmission light to coincide with each other,
- a reflection surface for reflecting the reflection light in a direction substantially the same as a propagation direction of the transmission light,
- means for reflecting remaining light components of the light incident on a portion other than said polarization splitting surface, and returning the reflected light components to said illumination means, at least some light components of the light returned to said illumination means being incident on said polarization splitting surface, and
- an optical element comprising at least one of a first optical element, arranged in an optical path of the reflection light, for converging the reflection light, and a second optical element, arranged in an optical path of the transmission light, for diverging the reflection light;
an image generator for modulating red, blue, and green reflection and transmission light components emerging from said three polarization conversion units to generate an image; and
a projection optical system for projecting the image.

22. A projector comprising:
illumination means for emitting light;
a color separation system for separating the light from said illumination light into red, green, and blue color light components;
two planar polarization conversion units, which are respectively arranged in a common optical path of the two color light components of the three color light components, and an optical path of the remaining color light component, and each of which is constituted by a plurality of units arranged along a common plane crossing the corresponding color light component, each of said units comprising a polarization splitting surface for splitting some light components of the light into reflection light and transmission light having different polarization states, an optical phase plate for changing the polarization state of at least one of the reflection light and the transmission light to cause the polarization states of the reflection light and the transmission light to coincide with each other, a reflection surface for reflecting the reflection light in a direction substantially the same as a propagation direction of the transmission light, means for reflecting remaining light components of the light incident on a portion other than said polarization splitting surface, and returning the reflected light components to said illumination means, at least some light components of the light returned to said illumination means being incident on said polarization splitting surface, and an optical element comprising at least one of a first optical element, arranged in an optical path of the reflection light, for converging the reflection light, and a second optical element, arranged in an optical path of the transmission light, for diverging the reflection light;

an image generator for modulating red, blue, and green reflection and transmission light components emerging from said three polarization conversion units to generate an image; and a projection optical system for projecting the image.

23. A polarization conversion unit, which splits light into a pair of polarized light components having different polarization states, causes the polarization states of the pair of split polarized light components to coincide with each other, respectively outputs the pair of polarized light components having the coinciding polarization states, and illuminates a surface to be illuminated, comprising:

a convex lens for converging each of said pair of polarized light components onto a converging point, wherein said converging means has an optical axis which is between central rays of said pair of polarized light components, wherein said converging point is farther than the surface to be illuminated.

* * * * *